(12) United States Patent
Jones et al.

(10) Patent No.: US 9,723,812 B2
(45) Date of Patent: Aug. 8, 2017

(54) ELEVATED FEEDING TRAY APPARATUS

(71) Applicant: Act 3 Ventures Inc., Atlanta, GA (US)

(72) Inventors: Patricia M. Jones, Atlanta, GA (US); Michael Haddad, Decatur, GA (US); Daniel W. Rossborough, Sr., Marietta, GA (US); Daniel W. Rossborough, Jr., Marietta, GA (US)

(73) Assignee: ACT 3 VENTURES INC., Atlanta, GA (US)

( * ) Notice: Subject to any disclaimer, the term of this patent is extended or adjusted under 35 U.S.C. 154(b) by 0 days.

(21) Appl. No.: 15/075,087

(22) Filed: Mar. 18, 2016

(65) Prior Publication Data
US 2016/0255805 A1    Sep. 8, 2016

Related U.S. Application Data

(63) Continuation-in-part of application No. 14/019,960, filed on Sep. 6, 2013, now Pat. No. 9,445,577, and a
(Continued)

(51) Int. Cl.
*A01K 5/01* (2006.01)
*F16M 11/04* (2006.01)

(52) U.S. Cl.
CPC .......... *A01K 5/0114* (2013.01); *F16M 11/041* (2013.01)

(58) Field of Classification Search
CPC ...... A01K 5/01; A01K 5/0114; A01K 5/0121; A01K 5/0128; A01K 5/0135; A01K 5/0107; A01K 7/005
(Continued)

(56) References Cited

U.S. PATENT DOCUMENTS

| D24,173 S | 4/1895 | Atkinson et al. |
| D25,483 S | 5/1896 | Johnson |

(Continued)

FOREIGN PATENT DOCUMENTS

| GB | 2373494 | 9/2002 |
| JP | 2010063422 | 3/2010 |
| WO | 03069985 | 8/2003 |

OTHER PUBLICATIONS

Jones, Patricia M.; Corrected Notice of Allowability for U.S. Appl. No. 29/546,665, filed Nov. 24, 2015, mailed Sep. 14, 2016, 3 pgs.
(Continued)

*Primary Examiner* — Trinh Nguyen
(74) *Attorney, Agent, or Firm* — Taylor English Duma LLP

(57) ABSTRACT

An elevated feeding tray apparatus includes a tray riser and a tray. The tray riser includes an elevated base and a plurality of legs attached to the elevated base; the elevated base defining a one of a top outer edge and a top inner edge, a portion of the one of the top outer edge and the top inner edge of the tray riser at the rear end of the tray riser higher than the one of the top outer edge and the top inner edge of the tray riser at the front end of the tray riser; each of the plurality of legs including an attachment portion proximate to the tray and a foot portion distal from the attachment portion. The tray includes a tray separately removable from the tray riser, the tray including a bowl, the bowl defining a feeding cavity.

20 Claims, 30 Drawing Sheets

Related U.S. Application Data continuation-in-part of application No. 29/546,665, filed on Nov. 24, 2015, now Pat. No. Des. 770,099.

(58) Field of Classification Search
USPC .............. 119/51.01, 51.5, 52.1, 58, 60, 61.5, 119/61.57, 61.54
See application file for complete search history.

(56) References Cited

U.S. PATENT DOCUMENTS

| | | |
|---|---|---|
| 766,427 A | 8/1904 | Crowell |
| 1,185,440 A | 5/1916 | Schuetz |
| D96,018 S | 6/1935 | Cannon |
| 2,239,969 A | 4/1941 | Morthland |
| D172,715 S | 7/1954 | Hogan |
| 2,691,362 A | 10/1954 | Moyer |
| 2,812,891 A | 11/1957 | Carlson |
| D182,235 S | 3/1958 | Jaffe |
| 3,285,694 A | 11/1966 | Ferdinand |
| 3,345,670 A | 10/1967 | Charie |
| 3,611,998 A | 10/1971 | Loscalzo |
| D230,034 S | 1/1974 | Goldman et al. |
| D257,494 S | 11/1980 | Imhoff |
| D270,407 S | 9/1983 | Ochwat |
| D277,245 S | 1/1985 | Unverzagt |
| D279,445 S | 7/1985 | Jagger |
| 4,584,966 A | 4/1986 | Moore |
| D287,772 S | 1/1987 | Stewart |
| D289,807 S | 5/1987 | Russell |
| 4,800,845 A | 1/1989 | Budd |
| 4,925,032 A | 5/1990 | Liles |
| 4,973,018 A | 11/1990 | Agor |
| D313,486 S | 1/1991 | Conner |
| D313,487 S | 1/1991 | Conner |
| 5,046,633 A | 9/1991 | Chung |
| 5,062,527 A | 11/1991 | Westerman |
| 5,203,845 A | 4/1993 | Moore |
| D356,449 S | 3/1995 | Frye |
| D370,146 S | 5/1996 | Petronio |
| D377,430 S | 1/1997 | Hopwood |
| 5,845,605 A | 12/1998 | Malamphy |
| D406,925 S | 3/1999 | Sharon |
| D409,448 S | 5/1999 | Hudson et al. |
| D412,605 S | 8/1999 | Sharon |
| D421,697 S | 3/2000 | Hollinger |
| D426,752 S | 6/2000 | Whaley |
| 6,126,240 A | 10/2000 | Tse |
| D439,707 S | 3/2001 | Hansen et al. |
| D442,831 S | 5/2001 | Jacobs |
| D448,978 S | 10/2001 | Isbell |
| D451,709 S | 12/2001 | Heithecker |
| D454,234 S | 3/2002 | Weterrings |
| D465,884 S | 11/2002 | Ross |
| D467,044 S | 12/2002 | Tangolics |
| D467,687 S | 12/2002 | Tangolics |
| D470,631 S | 2/2003 | Teufel |
| D471,406 S | 3/2003 | Wellner |
| D471,677 S | 3/2003 | Northrop |
| D472,021 S | 3/2003 | Northrop |
| D473,758 S | 4/2003 | Wilson |
| D477,691 S | 7/2003 | Crowley |
| 6,588,367 B1 | 7/2003 | MacManus |
| 6,647,921 B2 | 11/2003 | Stokes et al. |
| D494,325 S | 8/2004 | Paterson |
| D501,683 S | 2/2005 | Hernandez et al. |
| D502,294 S | 2/2005 | Hung |
| 6,860,229 B1 | 3/2005 | Craft |
| D504,196 S | 4/2005 | Huthmaker et al. |
| D506,644 S | 6/2005 | Poupel et al. |
| D514,750 S | 2/2006 | Matula |
| D515,878 S | 2/2006 | Czepowicz |
| D516,025 S | 2/2006 | Quinn |
| D540,623 S | 4/2007 | Schreiber-Pethan |
| D547,615 S | 7/2007 | Wasserman et al. |
| D548,014 S | 8/2007 | Kell |
| D563,606 S | 3/2008 | Hood et al. |
| D564,844 S | 3/2008 | Schreiber-Pethan et al. |
| D584,967 S | 1/2009 | Shamoon |
| D586,611 S | 2/2009 | Solis et al. |
| D590,109 S | 4/2009 | Anderson et al. |
| D600,862 S | 9/2009 | Sin |
| D607,616 S | 1/2010 | Newsome et al. |
| D607,648 S | 1/2010 | Nanda |
| D613,999 S | 4/2010 | Sierra |
| D621,559 S | 8/2010 | Clark, Jr. |
| D623,359 S | 9/2010 | Kim |
| 7,789,041 B1 | 9/2010 | Taylor |
| D625,885 S | 10/2010 | Bianchi |
| D630,864 S | 1/2011 | Perelman |
| D634,167 S | 3/2011 | Foster |
| D636,945 S | 4/2011 | Anderson et al. |
| D642,025 S | 7/2011 | Scheurer |
| D646,442 S | 10/2011 | Chance et al. |
| D646,852 S | 10/2011 | Chance |
| D647,502 S | 10/2011 | Holzer |
| 8,056,145 B2 | 11/2011 | Shamsnobari et al. |
| D653,000 S | 1/2012 | Rutherford |
| D653,474 S | 2/2012 | Garcia et al. |
| D659,300 S | 5/2012 | Lipscomb |
| D659,914 S | 5/2012 | Lipscomb |
| D662,939 S | 7/2012 | Akana et al. |
| D665,541 S | 8/2012 | Shamoon |
| D670,041 S | 10/2012 | Chance et al. |
| D676,710 S | 2/2013 | Kwok |
| 8,381,684 B2 | 2/2013 | Crawford |
| D685,619 S | 7/2013 | Sundaram |
| D687,938 S | 8/2013 | Furner et al. |
| D701,005 S | 3/2014 | Gilkey et al. |
| D703,393 S | 4/2014 | Henley |
| D709,654 S | 7/2014 | Lipscomb et al. |
| D712,524 S | 9/2014 | O'Grady |
| 8,985,054 B2 | 3/2015 | Lipscomb et al. |
| D726,981 S | 4/2015 | Yessin |
| D744,173 S | 11/2015 | Jones et al. |
| D744,174 S | 11/2015 | Jones |
| D755,447 S | 5/2016 | Andrews et al. |
| D757,373 S | 5/2016 | Breit |
| D758,674 S | 6/2016 | Youn |
| 9,445,577 B2 | 9/2016 | Jones et al. |
| D770,099 S | 10/2016 | Jones et al. |
| 2003/0066937 A1 | 4/2003 | Smith |
| 2005/0039689 A1 | 2/2005 | Mossmer |
| 2005/0039690 A1 | 2/2005 | Sage, Jr. |
| 2006/0005775 A1 | 1/2006 | Ritchey et al. |
| 2006/0027178 A1 | 2/2006 | Stephens |
| 2006/0113200 A1 | 6/2006 | Abkarian |
| 2007/0089678 A1 | 4/2007 | Greenwood |
| 2007/0284423 A1 | 12/2007 | Fioritti |
| 2008/0230009 A1* | 9/2008 | Craig .................... A01K 7/027 119/73 |
| 2009/0126641 A1 | 5/2009 | Anderson et al. |
| 2010/0180827 A1* | 7/2010 | Becattini, Jr. ......... A01K 7/005 119/61.54 |
| 2010/0275852 A1 | 11/2010 | Lipscomb et al. |
| 2014/0346293 A1 | 11/2014 | Qiu |
| 2014/0352621 A1 | 12/2014 | Fairbanks |
| 2015/0059652 A1 | 3/2015 | Rabideau |
| 2015/0101543 A1 | 4/2015 | Baxter et al. |

OTHER PUBLICATIONS

Jones, Patricia M.; Issue Notification for U.S. Appl. No. 29/546,665, filed Nov. 24, 2015, mailed Oct. 5, 2016, 1 pg.
Jones, Patricia M.; Supplemental Notice of Allowance for U.S. Appl. No. 29/546,665, filed Nov. 24, 2015, mailed Sep. 27, 2016, 4 pgs.
Jones, Patricia M.; Final Office Action for U.S. Appl. No. 14/019,960, filed Sep. 6, 2013, mailed Nov. 5, 2015, 23 pgs.
Jones, Patricia M.; Non-Final Office Action for U.S. Appl. No. 14/019,960, filed Sep. 6, 2013, mailed May 7, 2015, 21 pgs.
Jones, Patricia M.; Notice of Allowance for U.S. Appl. No. 14/019,960, filed Sep. 6, 2013, mailed Apr. 27, 2016, 26 pgs.

(56) References Cited

OTHER PUBLICATIONS

Jones, Patricia M.; Restriction Requirement for U.S. Appl. No. 14/019,960, filed Sep. 6, 2013, mailed Mar. 26, 2015, 5 pgs.
Jones, Patricia M.; U.S. Patent Application entitled: Elevated Feeding Tray Apparatus having U.S. Appl. No. 14/019,960, filed Sep. 6, 2013, 19 pgs.
Jones, Patricia M.; Corrected Notice of Allowability for U.S. Appl. No. 29/521,229, filed Mar. 20, 2015, mailed Oct. 20, 2015, 9 pgs.
Jones, Patricia M.; Design Patent Application entitled: Elevated Dog Bowl having U.S. Appl. No. 29/521,229, filed Mar. 20, 2015, 7 pgs.
Jones, Patricia M.; Issue Notification for U.S. Appl. No. 29/521,229, filed Mar. 20, 2015, mailed Nov. 4, 2015, 1 pg.
Jones, Patricia M.; Notice of Allowance for U.S. Appl. No. 29/521,229, filed Mar. 20, 2015, mailed Jul. 15, 2015, 13 pgs.
Jones, Patricia M.; Corrected Notice of Allowability for U.S. Appl. No. 29/521,231, filed Mar. 20, 2015, mailed Oct. 20, 2015, 4 pgs.
Jones, Patricia M.; Design Patent Application entitled: Elevated Pet Bowl having U.S. Appl. No. 29/521,231, filed Mar. 20, 2015, 7 pgs.
Jones, Patricia M.; Issue Notification for U.S. Appl. No. 29/521,231, filed Mar. 20, 2015, mailed Nov. 4, 2015, 1 pg.
Jones, Patricia M.; Notice of Allowance for U.S. Appl. No. 29/521,231, filed Mar. 20, 2015, mailed Jul. 20, 2015, 18 pgs.
Jones, Patricia M.; U.S. Patent Application entitled: Elevated Cat Bowl having U.S. Appl. No. 29/546,665, filed Nov. 24, 2015, 6 pgs.
Doca Pet, "Dogleg Diner", located at http://www.docapet.com/dogleg-diner.html, accessed on Jul. 22, 2013, 5 pgs.
Dylankendall.com Paw Footed Bowls, Sep. 2013, 1 page.
Lakeside.com, Paw footed feeder stands, 2015, 1 page.
Pets Stop, "Cantilever Double Diners", located at http://www.petsstop.com/product.php?id=547&paso=1, accessed on Jul. 22, 2013, 5 pgs.
Serafin, Mike; "Bent Soap Dish", located at http://www.memikeserafin.com/110810/973737/work/bent-soap-dish, accessed on Jul. 25, 2013, 5 pgs.
Jones, Patricia M.; Issue Notification for U.S. Appl. No. 14/019,960, filed Sep. 6, 2013, mailed Aug. 31, 2016, 1 pg.
Jones, Patricia M.; Supplemental Notice of Allowability for U.S. Appl. No. 14/019,960, filed Sep. 6, 2013, mailed Aug. 18, 2016, 8 pgs.
Jones, Patricia M.; Supplementary Notice of Allowance for U.S. Appl. No. 14/019,960, filed Sep. 6, 2013, mailed Jul. 1, 2016, 6 pgs.
Jones, Patricia M.; Notice of Allowance for U.S. Appl. No. 29/546,665, filed Nov. 24, 2015, mailed Jun. 24, 2016, 23 pgs.

\* cited by examiner

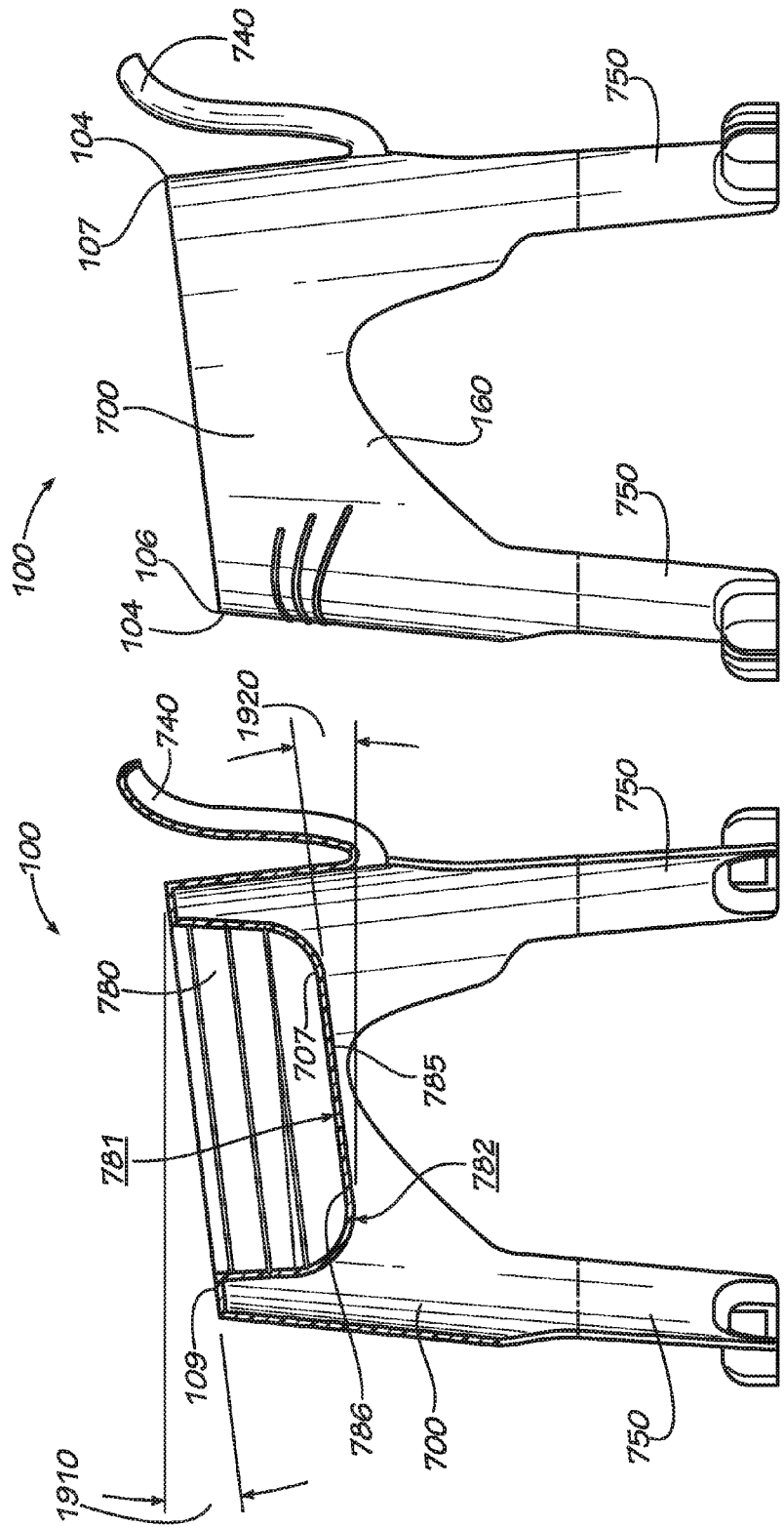

ELEVATED FEEDING TRAY APPARATUS

REFERENCE TO RELATED APPLICATIONS

This application is a continuation in-part of U.S. application Ser. No. 14/019,960, filed Sep. 6, 2013, and a continuation in-part of U.S. application Ser. No. 29/546,665, filed Nov. 24, 2015, both of which are hereby specifically incorporated by reference herein in their entireties.

TECHNICAL FIELD

This disclosure relates to a tray for feeding. More specifically, this disclosure relates to an elevated tray for feeding domesticated animals such as dogs and cats.

BACKGROUND

It is sometimes desirable for a domesticated animal such as a dog or cat to be able to feed itself with food prepared by its caregiver. An animal that feeds itself, however, can get itself or the surrounding area messy during the feeding process. In addition, some animals can become anxious or frightened by not being able to monitor their surroundings. Such animals may feel that they must alternate between feeding and monitoring in order to feel safe because they cannot typically do both activities at the same time. These are just two of the problems that can be encountered by domesticated animals in feeding themselves.

SUMMARY

In one aspect of the current disclosure, disclosed is an elevated feeding tray apparatus comprising a tray defining a feeding cavity, a tray riser, and a base, where the tray, tray riser, and base are integrally formed from the same material.

In another aspect of the current disclosure, also disclosed is a blank for forming an elevated feeding tray apparatus comprising a tray bottom panel, the tray bottom panel comprising a left end, a right end distal to the left end, a top end, and a bottom end, a first side wall connected to the left end of the tray bottom panel, a second side wall connected to the right end of the tray bottom panel, a tray riser connected to the top end of the tray bottom panel, and a base connected to the tray riser.

In another aspect of the current disclosure, also disclosed is a method of forming an elevated feeding tray apparatus comprising the steps of preparing a blank, the blank comprising a tray bottom panel, two tray side walls, a tray riser, and a base, the base panel connected to the tray riser, the tray riser connected to the tray bottom panel, and the tray bottom panel connected to the two tray side walls; bending the blank to form a bend between the tray bottom panel and each of the two tray side walls; bending the blank to form a bend between the tray riser and the tray bottom panel, and bending the blank to form a bend between the base and the tray riser.

In another aspect of the current disclosure, also disclosed is an elevated feeding tray apparatus comprising a tray riser and a tray. The tray riser comprises an elevated base and a plurality of legs attached to the elevated base; the elevated base defining a one of a top outer edge and a top inner edge, a portion of the one of the top outer edge and the top inner edge of the tray riser at the rear end of the tray riser higher than the one of the top outer edge and the top inner edge of the tray riser at the front end of the tray riser; each of the plurality of legs comprising an attachment portion proximate to the tray and a foot portion distal from the attachment portion. The tray comprises a tray separately removable from the tray riser, the tray comprising a bowl, the bowl defining a feeding cavity.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The accompanying drawings, which are incorporated in and constitute a part of this specification, illustrate several aspects of the invention and together with the description, serve to explain various principles of the invention. The drawings are not necessarily drawn to scale. Corresponding features and components throughout the figures may be designated by matching reference characters for the sake of consistency and clarity.

FIG. 19 is a sectional view of the elevated feeding tray apparatus of FIG. 15 taken along line 19-19 of FIG. 17.

FIG. 20 is a side view of the elevated feeding tray apparatus of FIG. 15.

DETAILED DESCRIPTION

Figure 1:
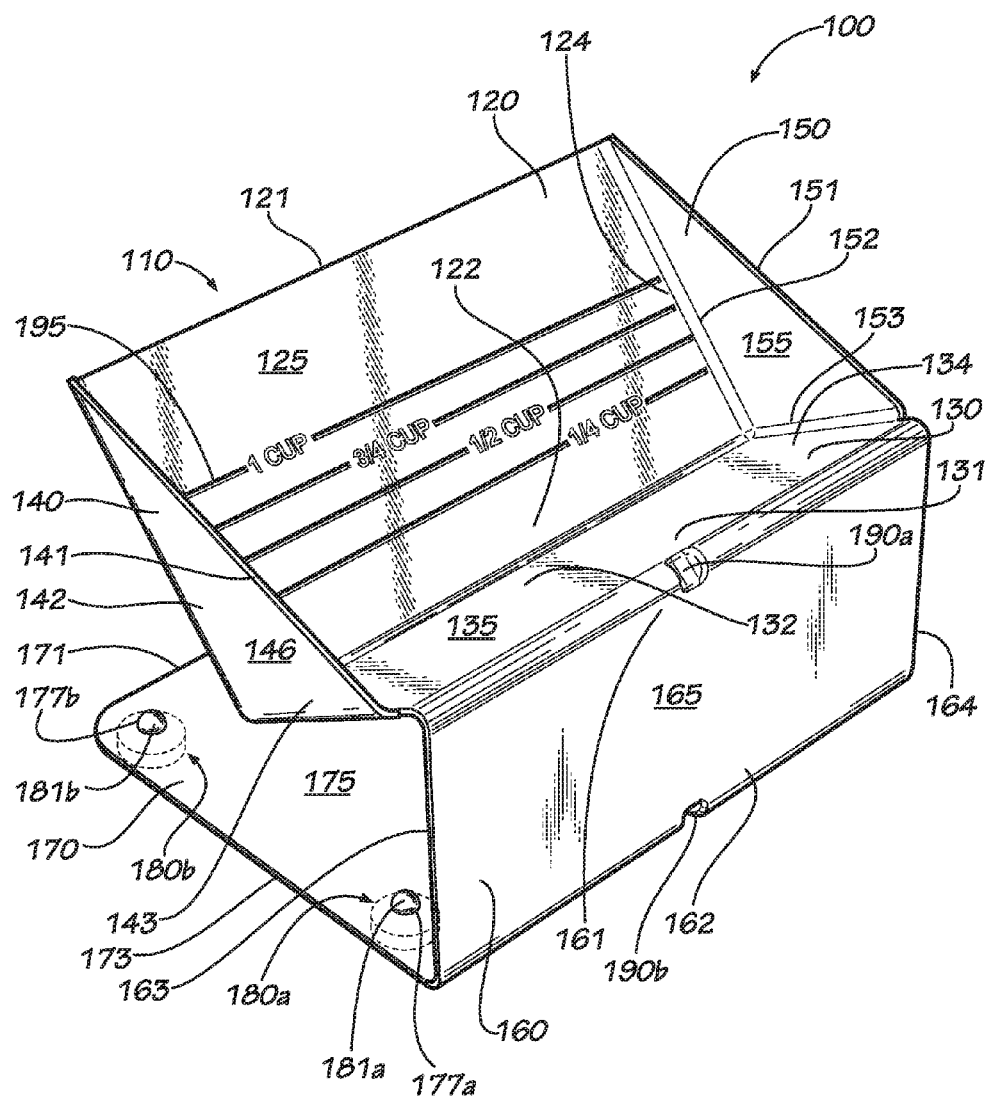
FIG. 1 is a perspective view of one embodiment of an elevated feeding tray apparatus according to the present disclosure.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a leg" can include two or more such legs unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

Disclosed is an elevated feeding tray apparatus and associated methods, systems, devices, and various apparatus. It would be understood by one of skill in the art that the disclosed elevated feeding tray apparatus is described in but a few exemplary embodiments among many. No particular terminology or description should be considered limiting on the disclosure or the scope of any claims issuing therefrom.

One embodiment of the elevated feeding tray apparatus is disclosed and described in FIG. 1. An elevated feeding tray apparatus 100 comprises a tray 110, a tray riser 160, a base 170, and feet 180a,b,c,d (180c,d shown in FIG. 4). The tray 110, the tray riser 160, and the base 170 of the current embodiment are made from a single material and formed as an integral body. While this embodiment also shows the tray 110, the tray riser 160, and the base 170 made from a single continuous blank of a single material, in other embodiments the tray 110, the tray riser 160, and the base 170 could be fabricated using more than one component joined together. In the process of describing the embodiments of the elevated feeding tray apparatus 100, the tray riser 160 may be described as tray riser panel 160 and base 170 may be described as base panel 170. In various embodiments, the feet 180a,b,c,d could be formed as part of the base 170. One of ordinary skill in the art will appreciate that joining the tray 110, the tray riser 160, and the base 170 could be accomplished using a number of different methods, including but not limited to welding or fastening through the use of rivets or other fasteners. Forming the tray 110, the tray riser 160, and the base 170 from a single continuous blank of a single material as in the current embodiment could be accomplished through the use of sheet metal such as 16 gage polished stainless steel. However, other grades and thicknesses of sheet metal or plastic or other suitable materials could be used as well. In addition, the elevated feeding tray apparatus 100 could be molded inside a die using a process such as injection molding, wherein the tray 110 could be optionally and additionally supported by a tray riser 160 that supports any one or more of the outer surfaces 126, 136, 146 or 156 (126, 136, and 156 shown in FIG. 6) of the tray 110 in addition to supporting the tray 110 in a cantilever fashion as shown.

Fabricating the elevated feeding tray apparatus 100 from a flat blank 600 (shown in FIG. 6) may result in the creation of external bend radii and may also result in the creation of internal bend radii. The external bend radii and internal bend radii exist in the present embodiment as shown in the figures but may not be present in other embodiments. The external bend radii and internal bend radii may be desired in order to improve cleanability and safety of the elevated feeding tray apparatus 100 due to the presence of smooth inside and outside corners instead of sharp inside and outside corners. Internal radii may improve cleanability and therefore also safety by the elimination of difficult-to-reach crevices, including on the inside of the cavity formed by tray 110 after forming. External radii may improve safety by the elimination of sharp corners that might otherwise become a hazard in some feeding, handling, or cleaning situations. For at least this reason and for increased manufacturability, a part molded inside a die, for example, instead of being bent from a flat blank such as flat blank 600, may also have these radii included.

Tray 110 of the disclosed embodiment comprises a rear bottom panel 120, a front bottom panel 130, a first side wall 140, and a second side wall 150. Tray 110 may have any number of bottom panels, and the selection of two bottom panels for the current embodiment should not connote any preference for any number of panels or for the shape of each panel. For example, there could be one continuous curved bottom panel replacing the rear bottom panel 120 and front bottom panel 130 of the current embodiment. In the current embodiment, the rear bottom panel 120 and front bottom panel 130 each have a top end, a bottom end, a left end, and a right end. Rear bottom panel 120 comprises a top end 121, a bottom end 122, a left end 123 (shown in FIG. 5), and a right end 124. Front bottom panel 130 comprises a top end 131, a bottom end 132, a left end 133 (shown in FIG. 5), and a right end 134. The rear bottom panel 120 and front bottom panel 130 are arranged in a "V" configuration such that the bottom end 122 of rear bottom panel 120 is connected to the bottom end 132 of front bottom panel 130 and the top ends 121, 131 are both higher than the bottom ends 122, 132 when the elevated feeding tray apparatus 100 is positioned as shown in FIG. 1 with base 170 resting on a horizontal surface.

In all of the various embodiments described, "front" and "rear" are used for convenience to differentiate the location of parts of the elevated feeding tray apparatus 100 that are in different positions relative to the user, whether it be the animal or its caregiver. Where these terms are used, the standard convention is to describe those components of the apparatus 100 that are closer to the animal when using the apparatus 100 with the "front" descriptor and to describe those components of the apparatus 100 that are further form the animal when using the apparatus 100 with the "rear" descriptor. Specifically in the embodiments as shown in the drawings and for purposes of defining the apparatus 100, the animal is assumed to be facing front surface 165 of tray riser 160 since this would be typical during use.

Each bottom panel of the current embodiment has a flat outer surface and a flat inner surface. Rear bottom panel 120 has an inner surface 125 and an outer surface 126 (shown in FIG. 3). Front bottom panel 130 has an inner surface 135 and an outer surface 136 (shown in FIG. 2). Although rear bottom panel 120 and front bottom panel 130 are both shown as rectangular in shape, rear bottom panel 120 and front bottom panel 130 may be of other shapes instead.

In the current embodiment, connected to the rear bottom panel 120 and front bottom panel 130 are first side wall 140 and second side wall 150. The second side wall 150 is distal to the first side wall 140. The first side wall 140 has a top end 141, a rear bottom end 142, and a front bottom end 143. The second side wall 150 has a top end 151, a rear bottom end 152, and a front bottom end 153.

Each side wall of the current embodiment has a flat outer surface and a flat inner surface. First side wall 140 has an inner surface 145 (shown in FIG. 5) and an outer surface 146. Second side wall 150 has an inner surface 155 and an outer surface 156 (shown in FIG. 6). Each side wall is substantially triangular in shape in the current embodiment to match the V-shaped profile formed by the rear bottom panel 120 and front bottom panel 130 when viewed from the side; however, each side wall could alternately be made in other shapes to match alternate profiles that could be created by the bottom panels, including bottom panel(s) that are fewer or greater in number than that shown in the current embodiment. In other embodiments, the side walls may also be increased in height, decreased in height or removed altogether.

A seam is formed at the intersection of the left end 123 of rear bottom panel 120 and the rear bottom end 142 of first side wall 140. The seam can be sealed by welding or by some other method such as a durable food-grade caulk. Welding, if used, can take the form of any one of several process types including but not limited to tungsten inert gas (TIG) welding and metal inert gas (MIG) welding. During the welding or caulking process, the radius may be formed by the filler material used during the process or may be formed ahead of time in the two or more panels being joined together to form a watertight seam. The seam formed at the intersection of the right end 124 of rear bottom panel 120 and the rear bottom end 152 of second side wall 150 can be sealed by a similar method. Making tray 110 watertight by welding or another method makes it possible for the tray to hold not only solid foods but also liquid foods or water without leaking. In yet other embodiments, the seam could be made tight or instead be left open without welding to produce a seam that is not watertight, or a stamping or drawing process could instead form some or all of tray 110 in order to eliminate some or all seams.

The rear bottom panel 120, the front bottom panel 130, the first side wall 140, and the second side wall 150 of tray 110 form a cavity. This cavity can be used to contain any solid or liquid material including solid food or even liquid food if the tray is made sufficiently watertight.

Connected to the top end 131 of front bottom panel 130 of tray 110 is tray riser 160. Tray riser 160 has a top end 161, a bottom end 162, a left end 163, and a right end 164. Tray riser 160 has a front surface 165 and a rear surface 166 (shown in FIG. 3). While tray riser 160 is substantially vertical in this embodiment, it may also form an angle with the horizontal that is more than or less than ninety degrees.

In the current embodiment shown in FIG. 1, tray 110 is cantileverly supported off tray riser 160. In other words, the top front edge of tray 110 is connected to and supported off the top end 161 of tray riser 160 in a similar way that a cantilever beam is supported off a wall.

Connected to the bottom end 162 of tray riser 160 is base 170. Base 170 has a rear end 171, a front end 172 (shown in FIG. 4), a left end 173, and a right end 174 (shown in FIG. 4). In addition, base 170 has a top surface 175 and a bottom surface 176 (shown in FIG. 4). Base 170 also has cutouts 177*a,b,c,d* (177*c,d* shown in FIG. 6) for insertion of feet 180*a,b,c,d* (180*c,d* shown in FIG. 4). Feet 180*a,b,c,d* comprise insert portion 181*a,b,c,d* and foot portion 182*a,b,c,d*. Stiffening of the intersection of tray riser 160 and front bottom panel 130 or the intersection of tray riser 160 and base 170—specifically a bend in the current embodiment although in other embodiments the intersection may take on other forms—is possible through the addition of upper indentation 190*a* or lower indentation 190*b* or both. There may be multiple instances of upper indentation 190*a* or lower indentation 190*b* or both in order to increase the stiffness further. Indentations 190*a,b* can be any disruption or interruption in a bend or similar intersection between two panels that causes the material at the bend to be deformed or to otherwise have a different shape in one localized area. One or more indentations 190*a,b* will cause the tray 110 to be able to support more weight while limiting the movement of the tray 110 with respect to the tray riser 160 and base 170 and the movement of tray riser 160 with respect to base 170. Indentations 190*a,b*, or any equivalent, are not present in some embodiments In the current embodiment, fill level indicia 195 are etched into inner surface 125 of rear bottom panel 120. However, fill level indicia 195 may be placed on any surface of the tray. For purposes of describing the apparatus, to "place on" the surface means to make visible on the surface through any process, including but not limited to etching, engraving, carving, cutting, stamping, indenting, embossing, painting, or printing, either directly on the material of the tray or on a separate piece of material such as a label that is affixed to an outer surface of the tray. To illustrate in the case of a tray such as tray 110 that is made from a translucent material, the fill level indicia 195 could be printed in reverse on a label affixed to an outer surface 126, 136, 146, or 156 and be visible to someone viewing through an inner surface 125, 135, 145, or 155 of the tray 110. As described above, the fill level indicia 195 may also be made to facilitate cleanability by eliminating recesses in the surface that might collect food. Eliminating recesses in fill level indicia 195 could be accomplished by filling any etched areas with a filler material such as but not limited to colored epoxy or by using any process of placing fill level indicia 195 on the surface that does not create recesses.

The fill level indicia 195 allow a precise amount of food to be placed in the tray 110 as may be desired. It may be desirable to be able to feed an animal a precise amount of food in order to promote its proper growth or overall health. The individual quantity, location and type of lines and figures making up fill level indicia 195 may vary in order to accommodate different sizes of tray 110, different levels of precision, different levels of readability, different languages or identifying marks that are universal between markets in which different languages are used. It should also be noted that additional lines and figures could be etched or otherwise marked on the surface of the tray 110 or any portion of the elevated feeding tray apparatus 100 in order to communicate information about the product itself such as product brand, product manufacturer, date of manufacture, issued patent number, and brand website. Depending on the process used to produce the markings, some or all of fill level indicia 195 and any other accompanied marking could be incorporated during or after production of the elevated feeding tray apparatus 100.

All panels making up the elevated feeding tray apparatus 100 of the current embodiment are substantially planar but need not remain so in other embodiments. Each panel except for the base panel 170 for example, could be formed to curve inwardly or outwardly. The base panel 170 could be formed to curve inwardly or outwardly if it does not cause the elevated feeding tray apparatus 100 as a whole to become unstable.

Figure 2:
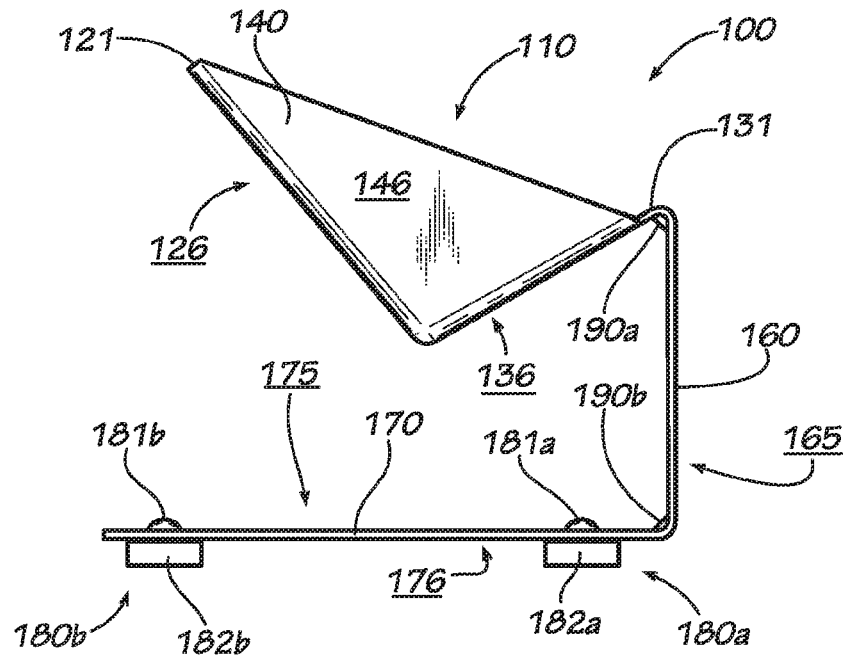
FIG. 2 is a side view of the elevated feeding tray apparatus of FIG. 1.

FIG. 2 shows a side view of the elevated feeding tray apparatus 100 of FIG. 1. Clearly visible in this view are feet 180*a,b* including foot portions 182*a,b* and also insert portions 181*a,b* penetrating base 170 through cutouts 177*a,b*, respectively (shown in FIG. 6). Also visible in this view are tray 110, outer surface 146 of first side wall 140, tray riser 160, indentations 190*a,b* and surfaces 126, 165, 175 and 176.

The feet 180*a,b,c,d* in the current embodiment are made of a skid control material that is flexible and resists sliding. It can be desirable to secure a feeding container, including the elevated feeding tray apparatus 100 of this embodiment, so that it does not slide on the floor, especially during feeding, because such securement can help an animal feed itself without moving the container or overturning the container or otherwise spilling the contents of the container. An example of the kind of skid control material that would be flexible and resist sliding is ethylene propylene diene monomer (EPDM) rubber, although any material could be substituted including materials with a greater tendency or lesser tendency to resist sliding depending on the specific application and including but not limited to silicone rubber, natural rubber, polyurethane, styrene butadiene rubber (SBR), SANTOPRENE™ thermoplastic vulcanizate, and ethylene vinyl acetate (EVA). The feet 180*a,b,c,d* could be alternatively replaced with a screw, pin, or other fastener so that the elevated feeding tray apparatus 100 could be temporarily or permanently attached to any mounting surface or the feet 180*a,b,c,d* could be left out altogether.

It can also clearly be shown in FIG. 2 that top end 121 of rear bottom panel 120 (shown in FIG. 1) is positioned higher vertically than top end 131 of front bottom panel 130 (shown in FIG. 1) in the current embodiment. Top end 121 can be alternatively described as the top back edge of the tray and top end 131 can be alternatively described as the top front edge of the tray. The relative position of these parts wherein the top back edge of the tray is higher than the top front edge of the tray, together with the presence of the side walls 140, 150 (shown in FIG. 1), can result in reduced spillage of food onto the area around the elevated feeding tray apparatus 100 during feeding and can help keep facial and body hair, as well as ears in some cases, of the animal from getting into the contents of the tray. In other embodiments, however, the top back edge of the tray may be even with the front top edge of the tray or lower than the front top edge of the tray.

Figure 3:
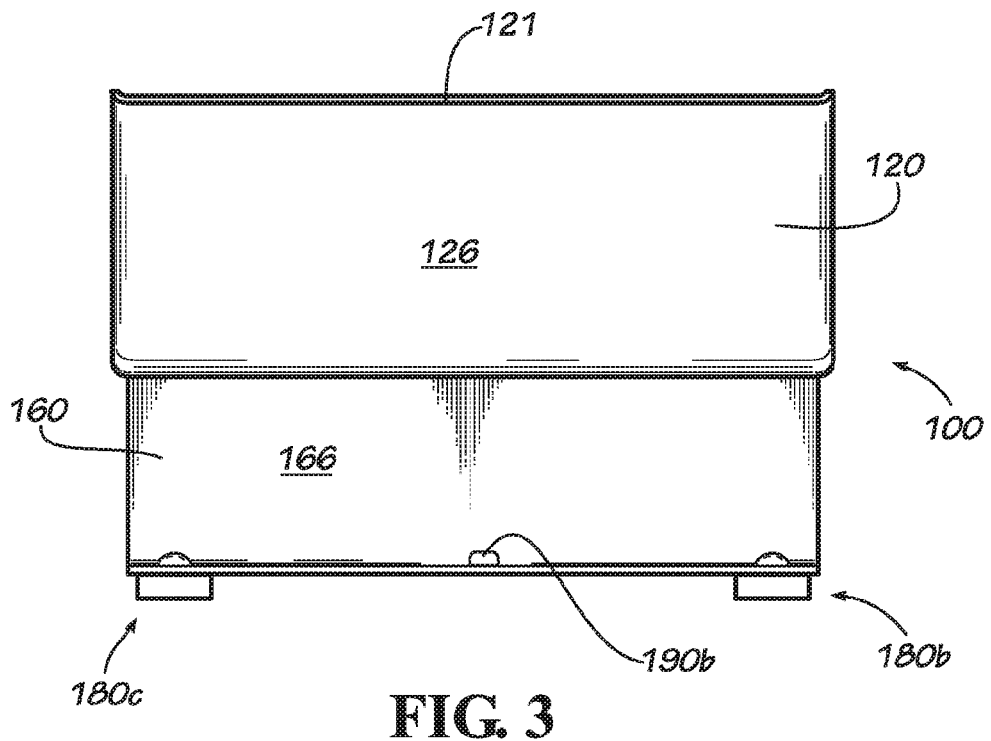
FIG. 3 is a rear view of the elevated feeding tray apparatus of FIG. 1.

FIG. 3 shows a rear view of the elevated feeding tray apparatus 100 of FIG. 1. Clearly shown in this view are feet 180*b,c*, outer surface 126 and top end 121 of rear bottom panel 120, rear surface 166 of tray riser 160, and lower indentation 190*b*.

Figure 4:
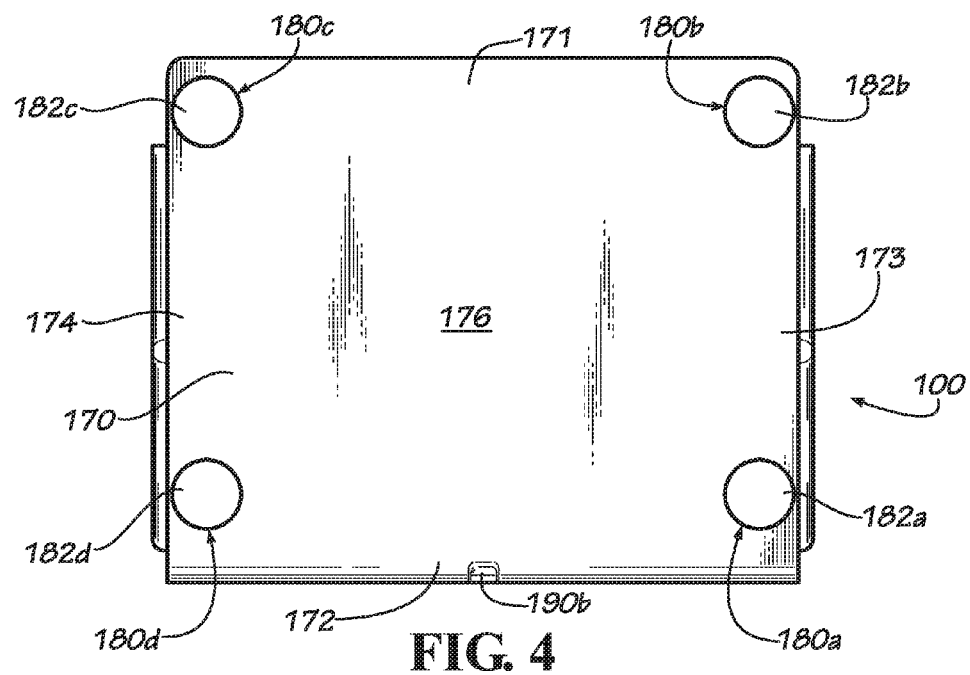
FIG. 4 is a bottom view of the elevated feeding tray apparatus of FIG. 1.

FIG. 4 shows a bottom view of the elevated feeding tray apparatus 100 of FIG. 1. Clearly shown in this view are the foot portions 182*a,b,c,d* of feet 180*a,b,c,d* as well as rear end 171, front end 172, left end 173, right end 174, and bottom surface 176 of base 170 as well as lower indentation 190*b*.

Figure 5:
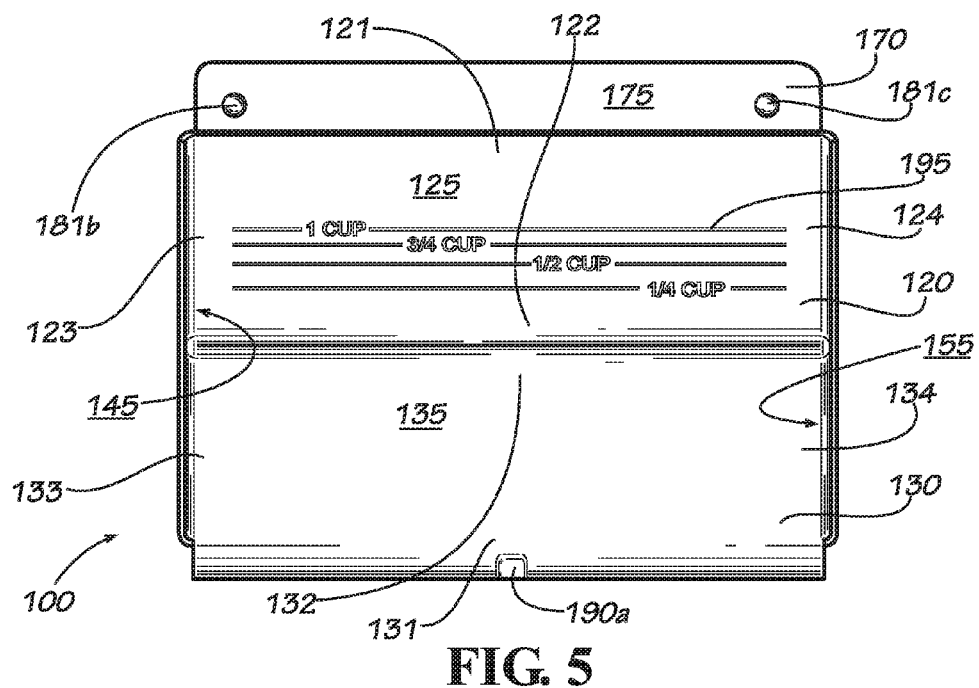
FIG. 5 is a top view of the elevated feeding tray apparatus of FIG. 1.

FIG. 5 shows a top view of the elevated feeding tray apparatus 100 of FIG. 1. Clearly shown in this view are the insert portions 181b,c of feet 180b,c (shown in FIG. 4) as well as upper indentation 190a, fill level indicia 195, left end 123 of rear bottom panel 120, left end 133 of front bottom panel 130, inner surface 145 of first side wall 140, inner surface 155 of second side wall 150, and top surface 175 of base 170. Also visible are top end 121, bottom end 122, right end 124, and inner surface 125 of rear bottom panel 120 and top end 131, bottom end 132, right end 134, and inner surface 135 of front bottom panel 130.

Figure 6:
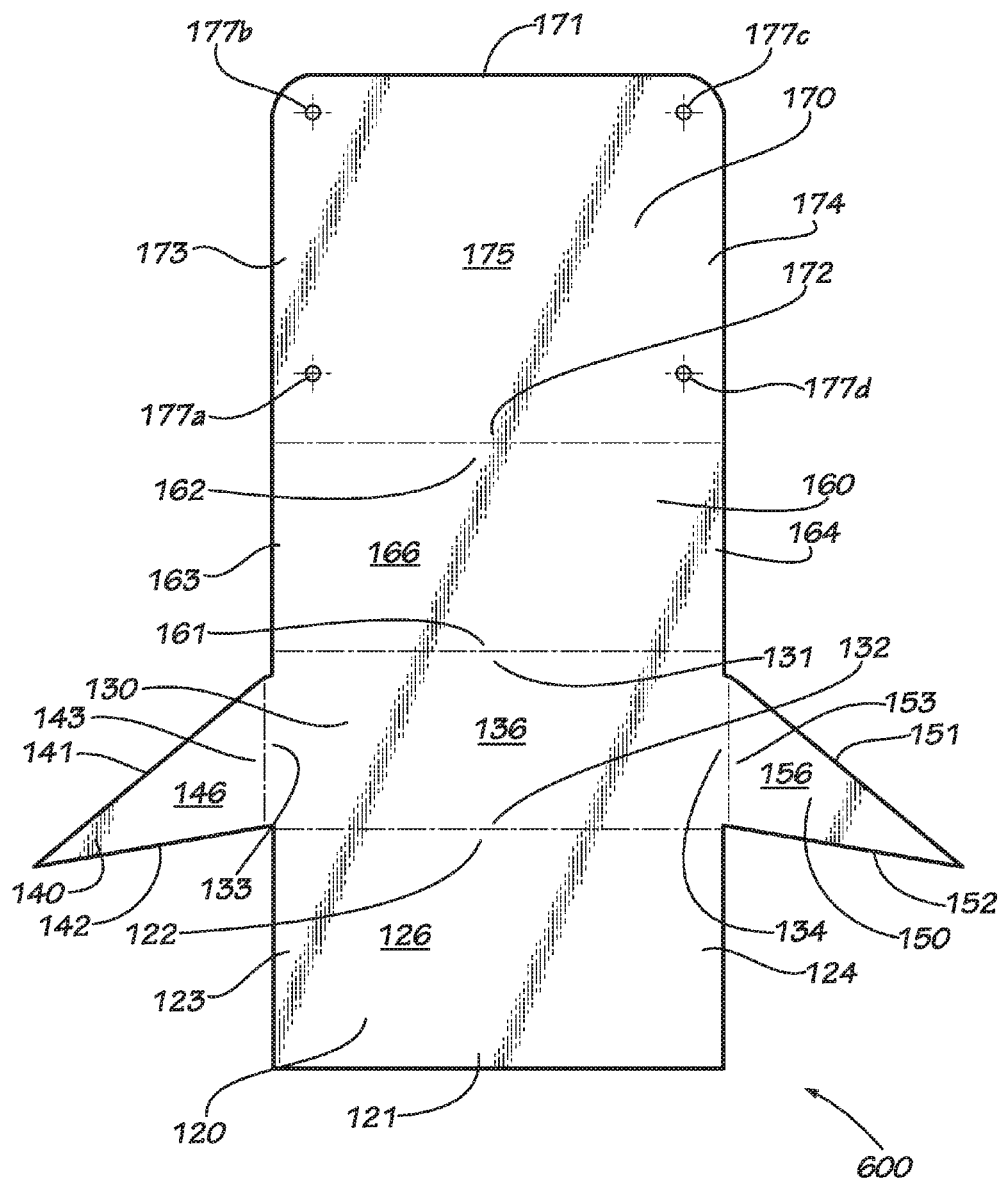
FIG. 6 is a schematic view of a blank for forming the elevated feeding tray apparatus of FIG. 1.

FIG. 6 shows a schematic view of blank 600 for forming the elevated feeding tray apparatus 100 of FIG. 1 from top surface 175 of base 170. In the current embodiment, the elevated feeding tray apparatus 100 is made of sheet metal such as but not limited to corrosion-resistant stainless steel and is designed to be bent into its final shape as shown in the perspective view of FIG. 1. It may be desirable to have a feeding container that resists corrosion, resists soiling, and is easily cleaned, and stainless steel is one type of material that may be used for these purposes. Bending can be accomplished by use of a press brake or similar equipment. As described previously, internal and external bend radii may be formed at each bend due to the nature of the process and the properties of sheet metal or may be added whether internal and external bend radii are formed by the process or not.

The schematic view in FIG. 6 of blank 600 shows front end 172 of base 170 connected to bottom end 162 of tray riser 160. Connected to top end 161 of tray riser 160 is top end 131 of front bottom panel 130. Connected to left end 133 of front bottom panel 130 is front bottom end 143 of first side wall 140. In a similar fashion, connected to right end 134 of front bottom panel 130 is front bottom end 153 of second side wall 150. Finally, connected to bottom end 132 of front bottom panel 130 is bottom end 122 of rear bottom panel 120. Included in base 170 of blank 600 are cutouts 177a,b,c,d. Cutouts 177a,b,c,d accept feet 180a,b,c,d in the current embodiment or can accept fasteners for attaching the tray in lieu of feet 180a,b,c,d. The number of shape of the cutouts can be less than or greater than what is shown. In other embodiments, the cutouts may be replaced with feet formed integrally from the blank. While the presence of four cutouts 177a,b,c,d may be advantageous in this embodiment by increasing the stability of the elevated feeding tray apparatus 100 once formed, a higher or lower quantity of cutouts may be advantageous in other embodiments.

Also shown in FIG. 6 are several elements of elevated feeding tray apparatus 100 that were previously introduced.

Other embodiments of the elevated feeding tray apparatus 100 could make use of a base 170 that extends beyond the tray in at least one direction to increase stability. In some embodiments, a base 170 that extends beyond tray 110 may increase the resistance of the elevated feeding tray apparatus 100 to being move or overturned. This could be made possible by increasing the size or base 170 relative to tray 110 such that in a horizontal plane defined by the base 170, the base extends beyond the tray 110 in at least one direction. An example of this is shown in FIG. 2 and in FIG. 5.

Figure 7:
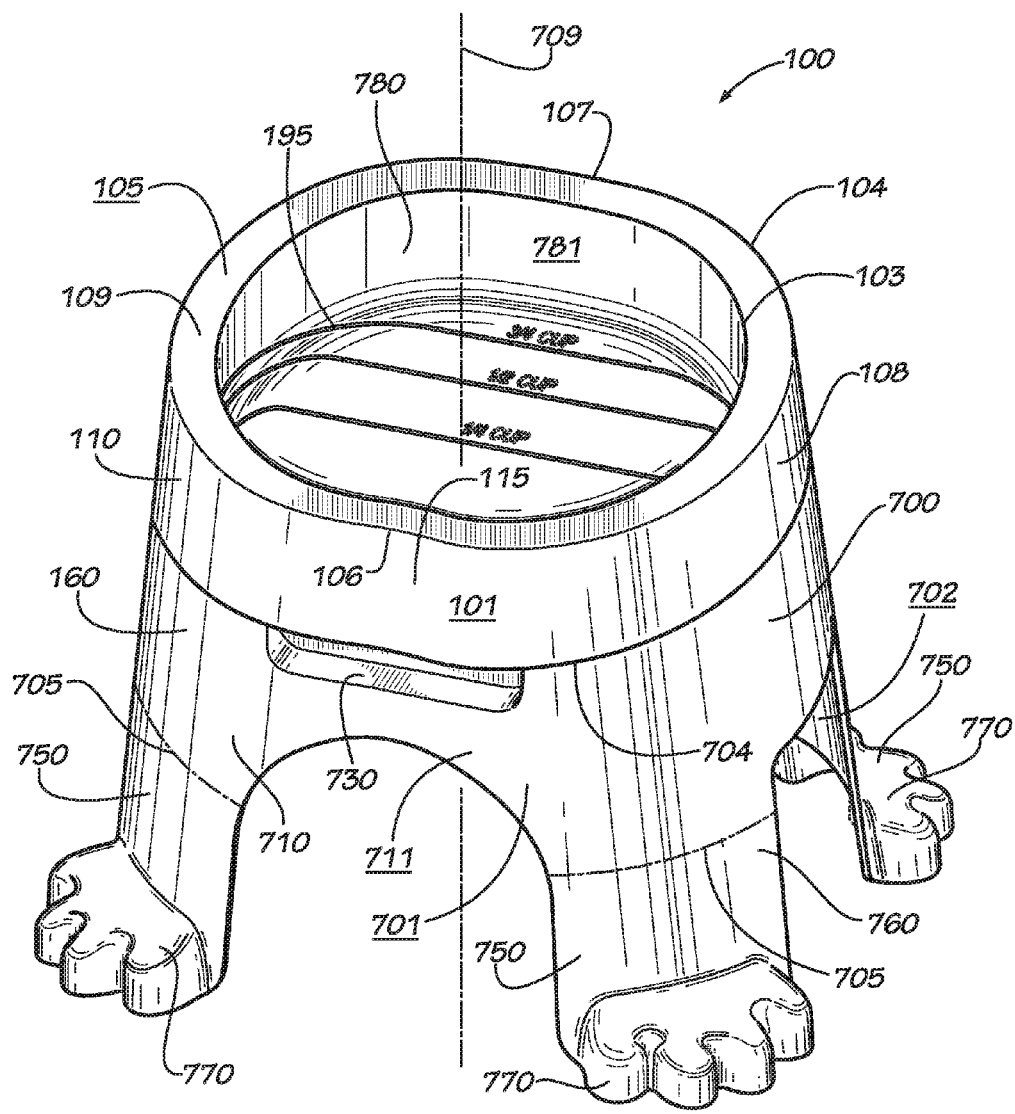
FIG. 7 is a perspective view of an elevated feeding tray apparatus in accordance with another aspect of the current disclosure.

FIGS. 7-14 show the elevated feeding tray apparatus 100 or components thereof in accordance with another aspect of the current disclosure. In this aspect, as shown in FIG. 7, the elevated feeding tray apparatus 100 comprises a tray riser 160 comprising an elevated base 700 and a plurality of legs 750 extending from the elevated base 700 at a boundary line 705 of the elevated base 700. In one aspect, the boundary line 705 delineates a point or a line from which alternate structures can extend. The boundary line 705 is shown for convenience to show such delineation and can be removed; the boundary line 705 does not itself represent physical structure. In one aspect, the elevated base 700 and the plurality of legs 750 of the tray riser 160 can be formed from substantially the same material. The precise appearance of the tray 110 and the tray riser 160 can have various forms beyond that disclosed.

The tray riser 160 defines an outer surface 701 and an inner surface 702. The elevated base 700 comprises a side wall 710 and a rim 720 (shown in FIG. 8) defining a top inner edge 703 (shown in FIG. 9), a top outer edge 704, an outer surface 711, and a rim surface 721 (shown in FIG. 9). In this aspect, the outer surface 701 of the tray riser 160 comprises the outer surface 711 of the elevated base 700 and the rim surface 721 of the elevated base 700.

In one aspect, each of the plurality of legs 750 comprises an attachment portion 760 proximate to the boundary line 705, a foot portion 770 distal from the attachment portion 760, and optionally a rib 790 (shown in FIG. 23) for increasing the compressive strength of the leg 750. The foot portion 770 of each of the plurality of legs 570 can comprise an extension 775 that extends outward from a vertical axis 709 of the elevated feeding tray apparatus 100. The vertical axis 709 can function as an assembly axis in one aspect. In one aspect, the elevated feeding tray apparatus 100 comprises four legs 750. In another aspect, the elevated feeding tray apparatus 100 comprises only a single leg 750 positioned to ensure the stability of the elevated feeding tray apparatus 100. In such aspect comprising only a single leg 750, the tray 110 can be cantileverly supported from the tray riser 160 such that the foot portion 770 of the single leg 750 extends under the tray 110 via the extension 775 to maintain the stability of the elevated feeding tray apparatus 100. In other aspects, the elevated feeding tray apparatus 100 can comprise any quantity of legs 750.

The number of the legs 750 and the size and shape of the legs 750 can be adjusted to improve the stability of the elevated feeding tray apparatus 100 and can also be adjusted as a play on the look of a particular animal by incorporating a stylized representation of such animal's foot, be it the foot of, for example and without limitation, a four-legged animal such as a dog, a cat, a pig, or a goat, a two-legged animal such as a bird, or any other animal or even a human. The size and shape and other aspects of the foot 750 is not meant to realistically reproduce the actual size and shape or even proportions of any particular animal's foot, and the precise appearance of the foot 750 can have various forms.

Figure 8:
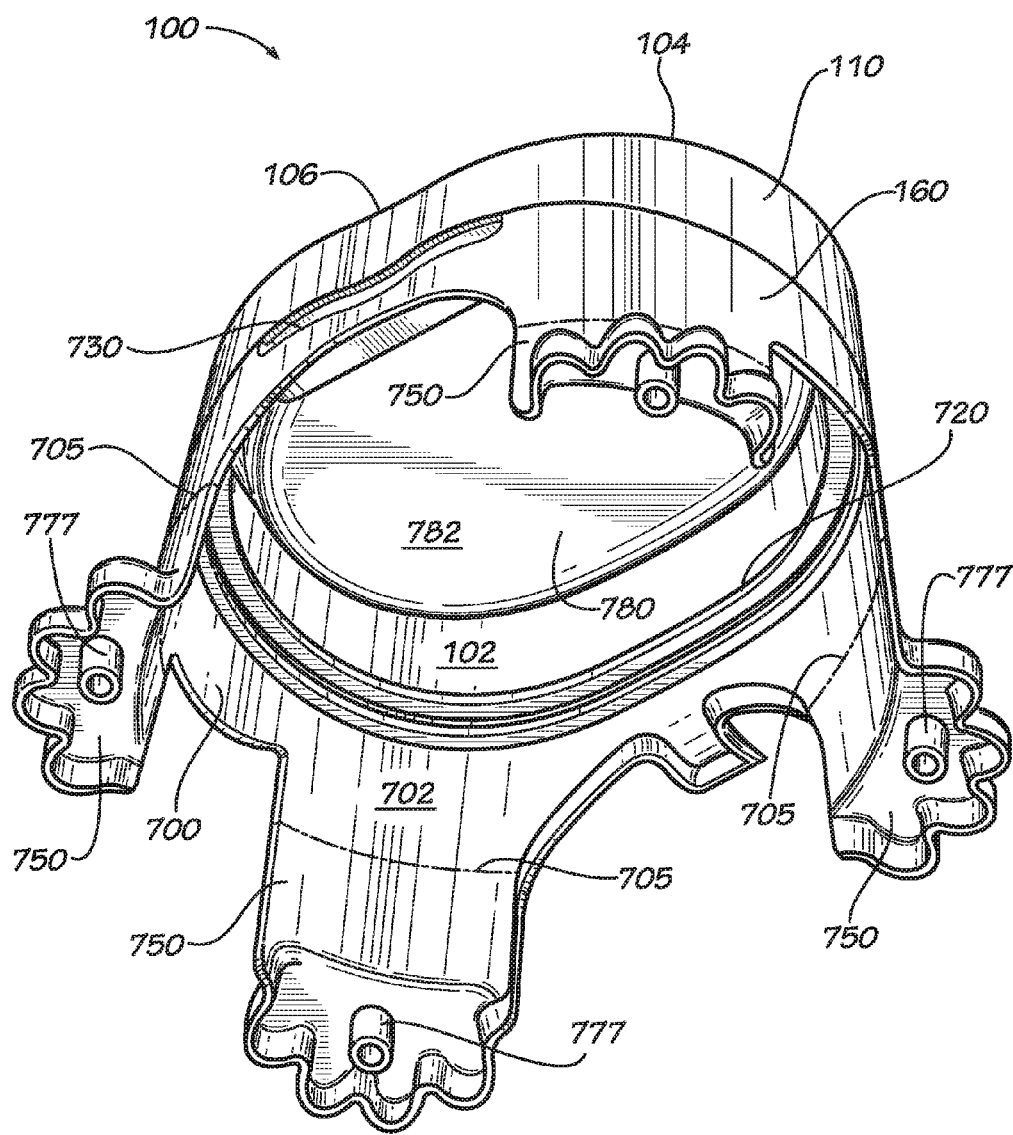
FIG. 8 is a bottom perspective view the elevated feeding tray apparatus of FIG. 7.

The elevated feeding tray apparatus 100 can also comprise a tray 110 that can be made separately removable from the tray riser 160, the tray 110 comprising a bowl 780, the bowl 780 defining a feeding cavity with an inner surface 781 and an outer surface 782 (shown in FIG. 8). As shown in FIG. 7, the tray 110 can comprise a side wall 108 and a rim 109 defining a top inner edge 103, a top outer edge 104, an outer surface 101 comprising a rim surface 105, and an inner surface 102 (shown in FIG. 8).

In one aspect, the tray 110 can define an asymmetrical feature 115 at the front end 106 or at the rear end 107 and corresponding with a matching feature on the tray riser 160, the precise appearance of which can have various forms. In one aspect, the asymmetrical feature 115 can help ensure that the tray 110 is oriented correctly with respect to the tray riser 160, the front end 106 of the tray 110 aligning with a front end of the tray riser 160. In such aspect, the tray 110 can be asymmetric about a vertical plane such as a vertical plane passing through the vertical axis 709, the tray 110 being configured to install on the tray riser 160 in only one orientation with a front end 106 of the tray 110 positioned proximate to a front of the tray riser 160. For example and without limitation, the asymmetrical feature 115 can be an undulation in the side wall 108. In another aspect, the asymmetrical features can have only an aesthetic function. As previously described, the tray 110—and specifically the bowl 780 in the current aspect—can define fill level indicia 195 to identify the level to which food inside the bowl 780 is filling the bowl 780.

The elevated base 700 of the tray riser 160 can further define a notch 730, the precise appearance of which can have various forms. In one aspect, the tray 110 and the tray riser 160 at the notch 730 defining an access gap 735 (shown in FIG. 10) that is configured to receive a human finger or similar tool for lifting the tray 110 from the tray riser 160 when the tray 110 is installed in the tray riser 160.

FIG. 8 shows a bottom perspective view of the elevated feeding tray apparatus 100. The rim 720 of the tray riser 160 is shown supporting the tray 110. The foot portion 770 of each of the plurality of legs 750 can further comprise a skid control material (not shown), optionally installed or otherwise held inside a receiver 777 of the foot portion 770 of the leg 750. The skid control material, for example and without limitation, can be formed into a flat shape that attaches to an outside surface of the receiver 777 or into a three-dimensional shape that installs inside the receiver 777 or installs outside and around the receiver 777.

Figure 9:
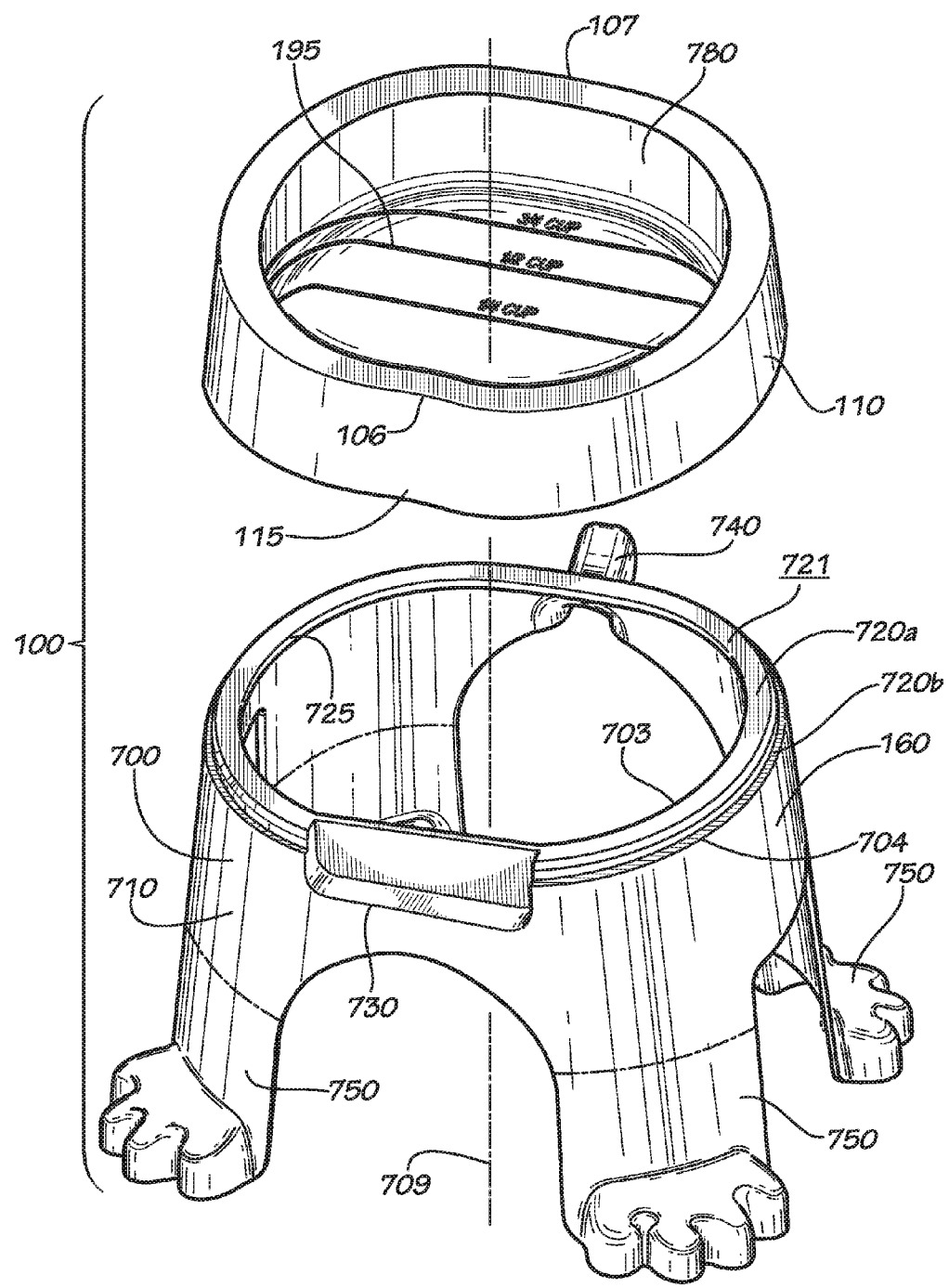
FIG. 9 is an exploded perspective view of the elevated feeding tray apparatus of FIG. 7.

FIG. 9 shows the tray 110 separated from the tray riser 160 along the axis 709 as the tray 110 could be removed for cleaning, storage, or replacement. As shown, the tray riser 160 can further comprise a tail feature 740, the precise appearance of which can have various forms.

In one aspect, the rim 720 comprises a first rim 720a and a second rim 720b. In such aspect, the second rim 720b lies in a horizontal orientation and is sized to receive the side wall 110 of the tray 110. The first rim 720a has a portion that lies in a horizontal orientation and a portion that lies in a vertical orientation. The second rim 720b can help maintain the position of the tray 110 when installed in the tray riser 160 and maintain a flat or flush surface across the substantially vertical side wall 710 of the tray riser 700 and the substantially vertical side wall 108 of the tray 110. The first rim 720a and the second rim 720b define the rim surface 721. In one aspect, the first rim 720 can define an opening 725 for receiving the bowl 780 of the tray 110. In another aspect, no opening 725 is necessary and the bowl 780 of the tray 110 does not extend below the rim surface 721.

Figure 10:
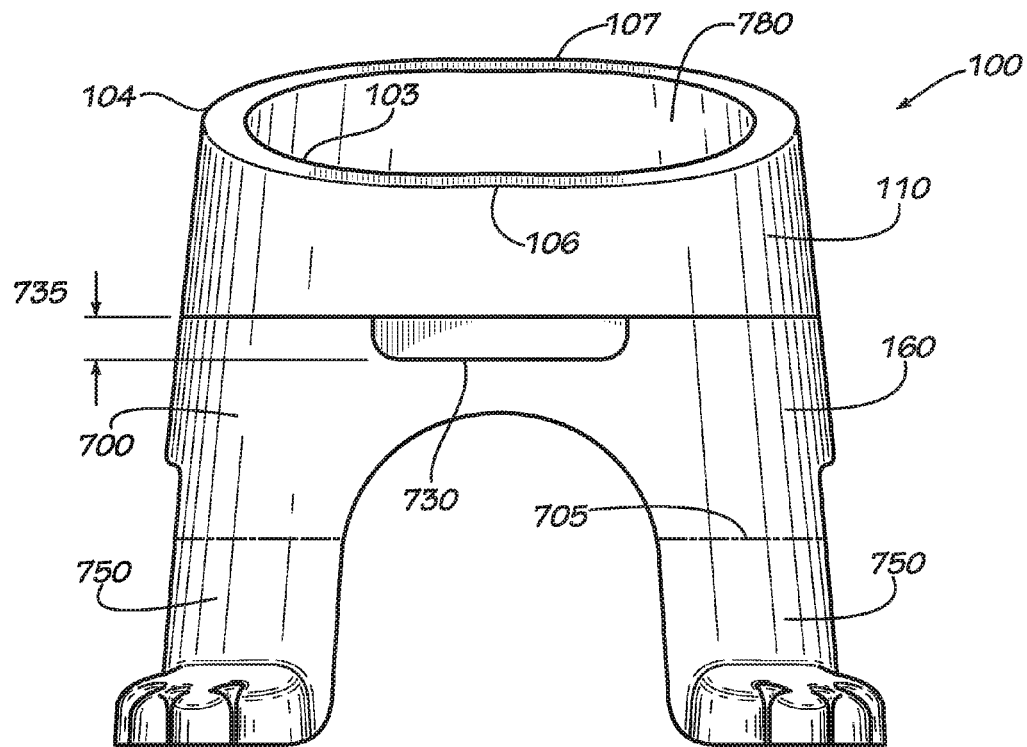
FIG. 10 is a front view of the elevated feeding tray apparatus of FIG. 7.
Figure 11:
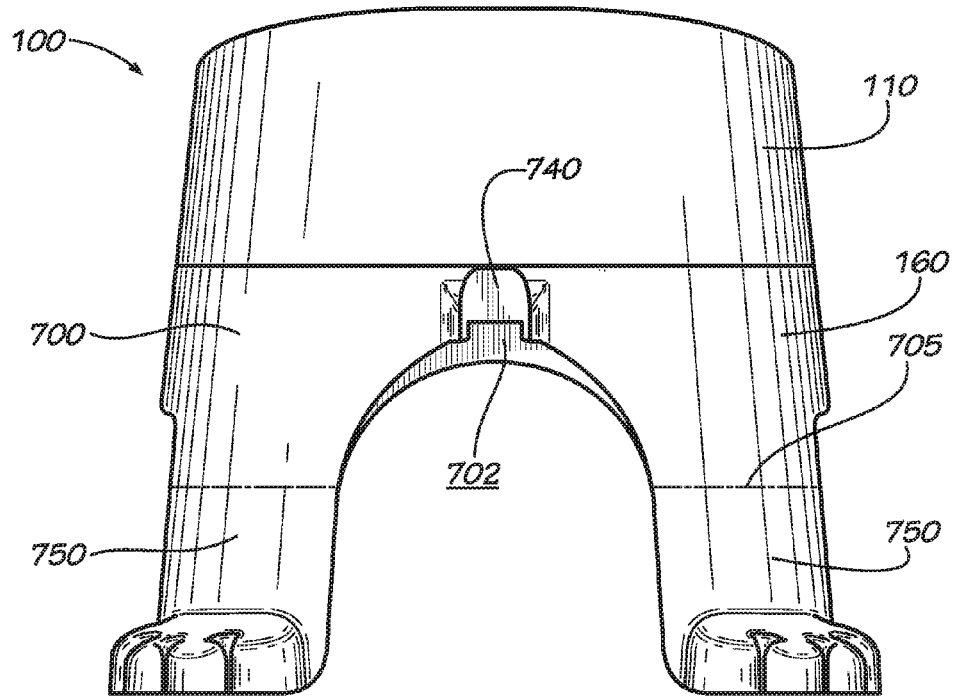
FIG. 11 is a rear view of the elevated feeding tray apparatus of FIG. 7.
Figure 12:
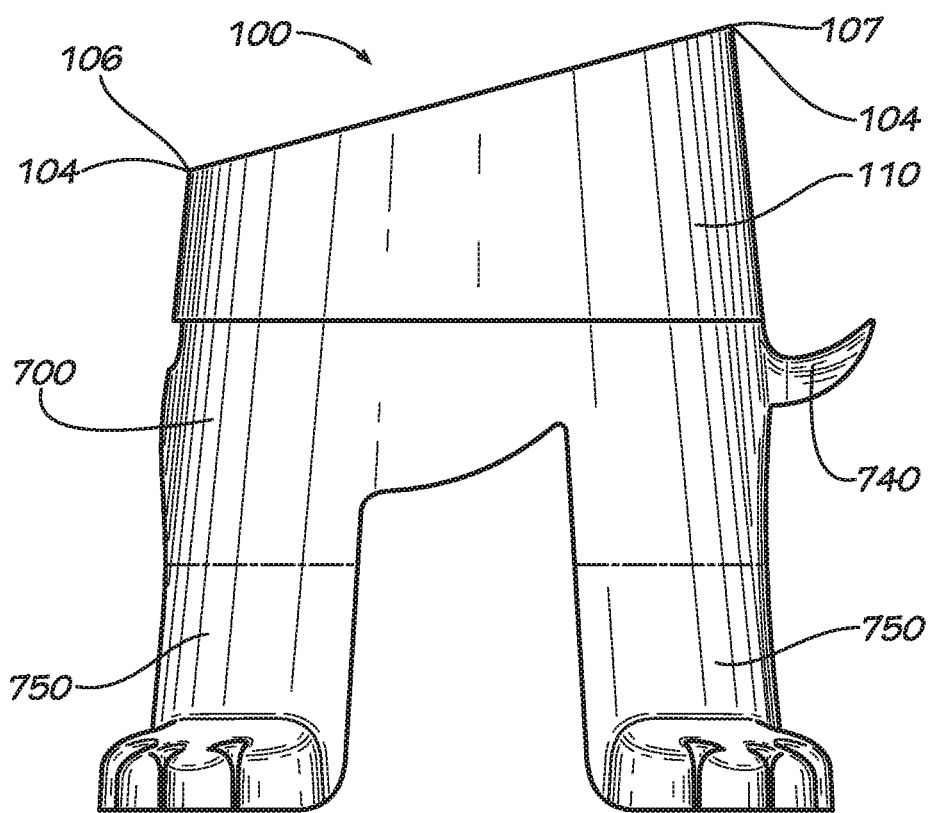
FIG. 12 is a side view of the elevated feeding tray apparatus of FIG. 7.

As shown in FIGS. 10-12, a portion of a one of the top inner edge 103 or the top outer edge 104 of the tray 110 at a rear end 107 of the tray 110 can be higher than a one of the top inner edge 103 or the top outer edge 104 of the tray riser at a front end 106 of the tray 110.

Figure 13:
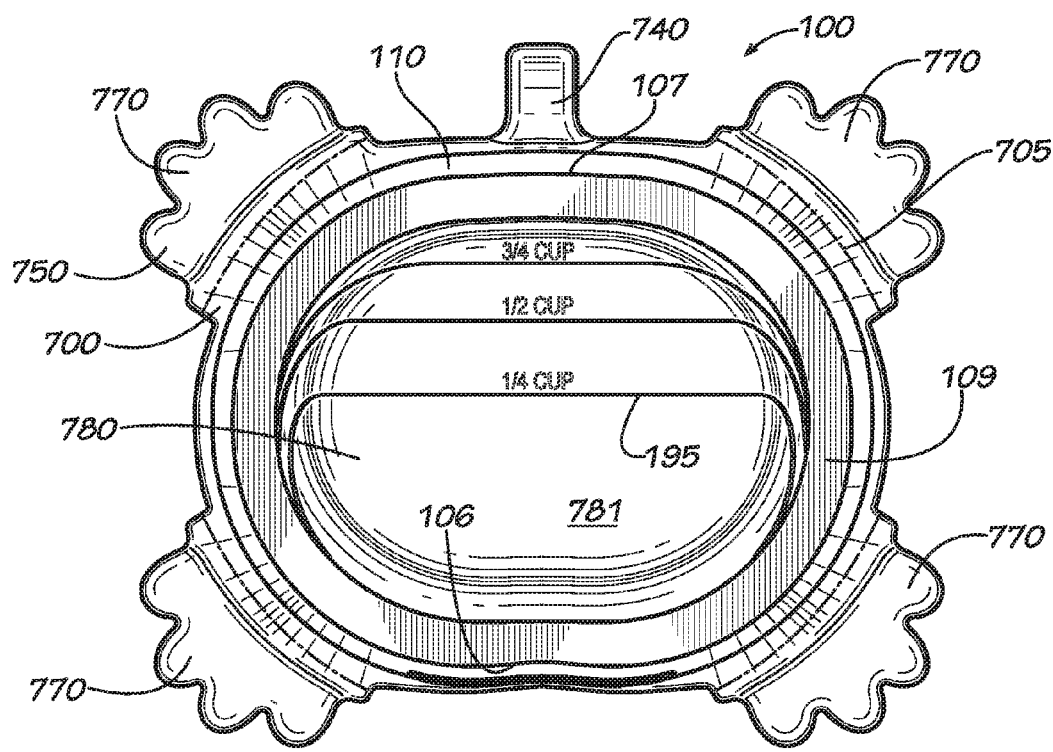
FIG. 13 is a top view of the elevated feeding tray apparatus of FIG. 7.
Figure 14:
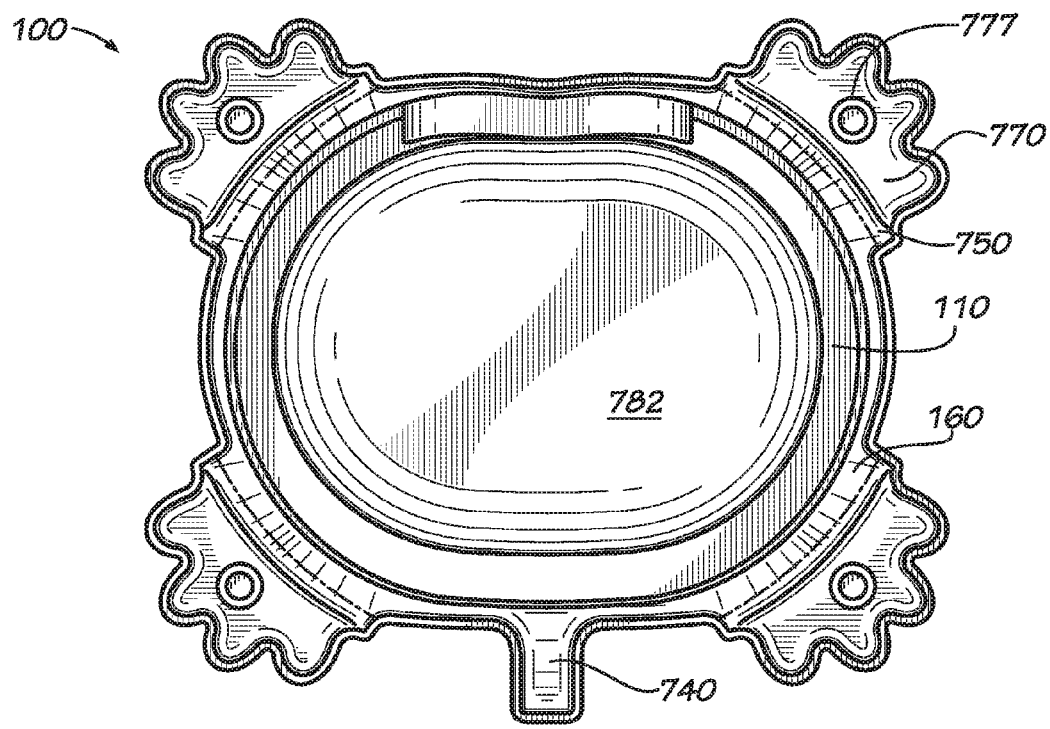
FIG. 14 is a bottom view of the elevated feeding tray apparatus of FIG. 7.

FIGS. 13 and 14 show the previously described features in top and bottom views, respectively, of the elevated feeding tray apparatus 100.

Figure 15:
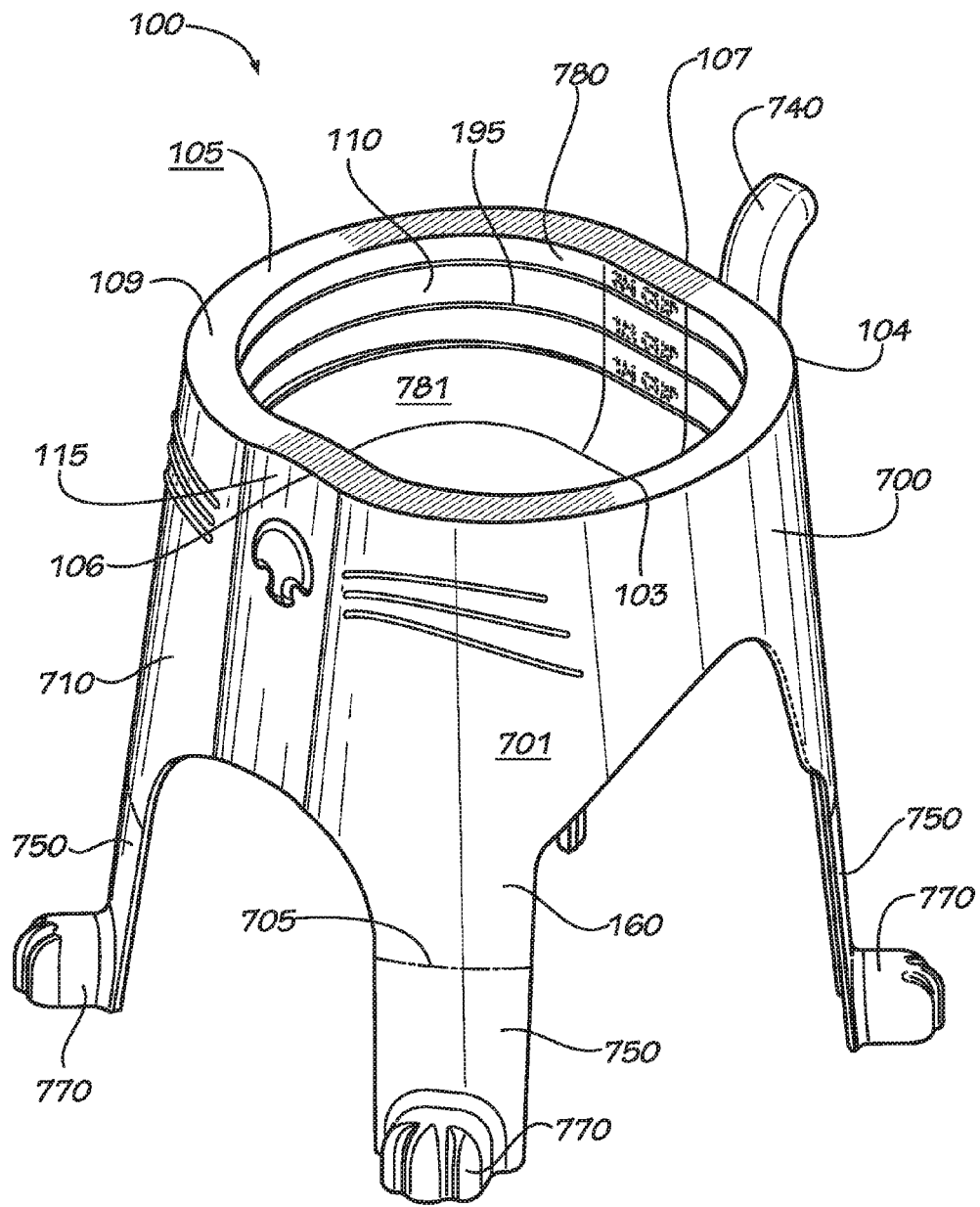
FIG. 15 is a side perspective view of an elevated feeding tray apparatus in accordance with yet another aspect of the current disclosure.
Figure 16:
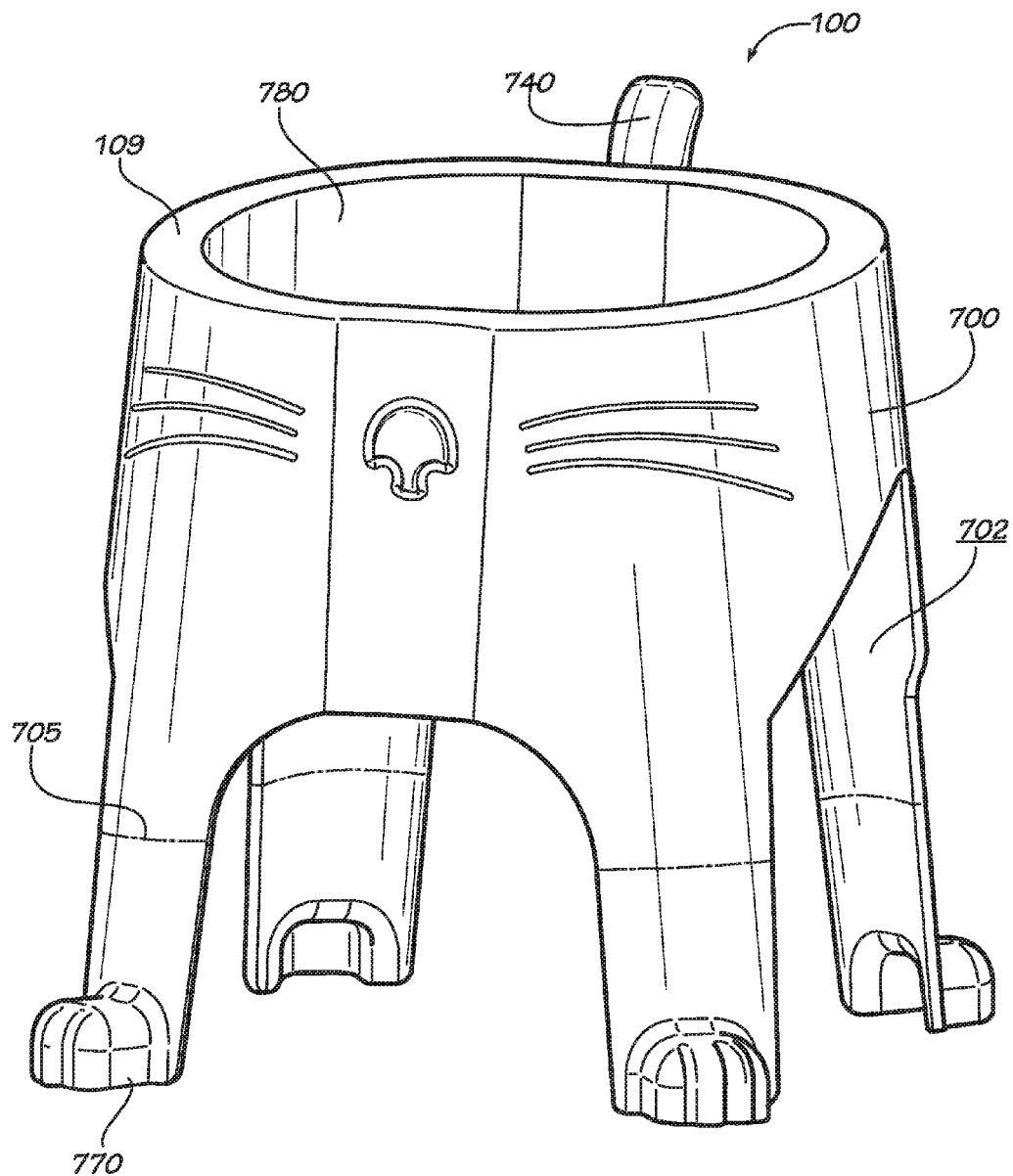
FIG. 16 is a front perspective view of the elevated feeding tray apparatus of FIG. 15.
Figure 18:
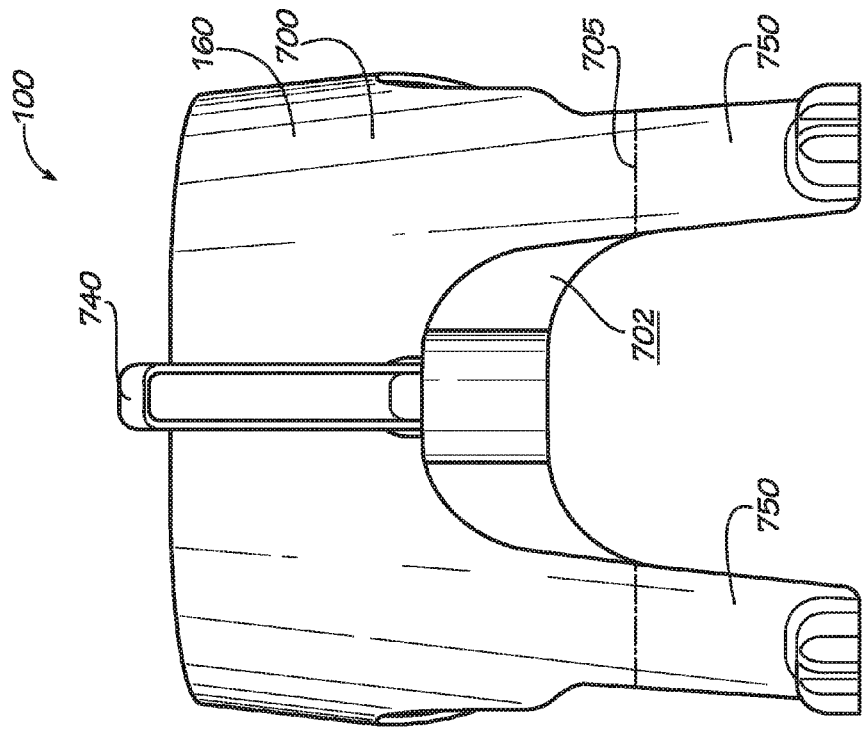
FIG. 18 is a rear view of the elevated feeding tray apparatus of FIG. 15.
Figure 17:
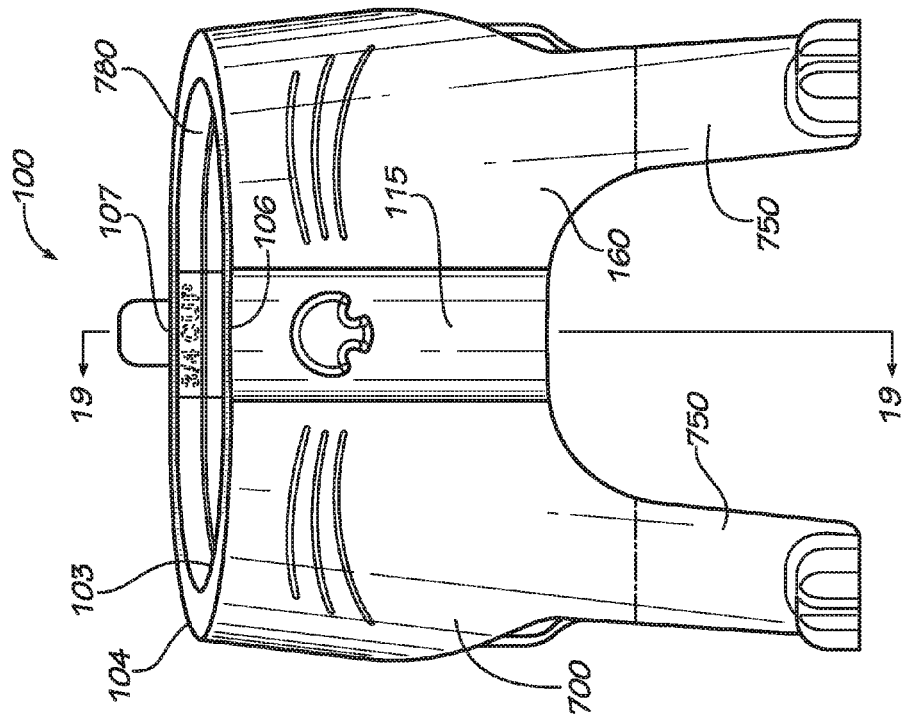
FIG. 17 is a front view of the elevated feeding tray apparatus of FIG. 15.

FIGS. 15-22 show the elevated feeding tray apparatus 100 or components thereof in accordance with yet another aspect of the current disclosure. In one aspect, as shown in FIG. 15, the tray riser 160 and the tray 110 can be integrally formed from substantially the same material. For example and without limitation, the tray riser 160 and the tray 110 can be integrally formed such as through an injection molding process using a plastic such as, for example and without limitation, acrylonitrile butadiene styrene (ABS). In such aspect, joints between the tray riser 160 and the tray 110 and crevices such as produced by the notch 730 shown, e.g., in FIG. 7, can be eliminated and the tray 110 itself apart from the bowl 780 and the rim 109 is incorporated into the tray riser 160. In another aspect, the tray riser 160 can be formed from one material and the tray 110 can be formed from a different material. For example and without limitation, the tray riser 160 can be formed from a plastic such as ABS and the tray 110 can be formed from stainless steel.

FIG. 19 shows a sectional view of the elevated feeding tray apparatus 110. The rim 109 is shown sloped at an angle 1910 from the horizontal, and a tray bottom panel 785 is shown sloped at an angle 1920 from the horizontal. The inner surface 781 of the bowl 780 can comprise radii such as the radii shown to facilitate cleaning. In one aspect, the angle 1910 and the angle 1920 can both measure about 7.5 degrees. In another aspect, the angle 1910 and the angle 1920 can be less than or greater than 7.5 degrees. The tray bottom panel 785 can be substantially planar as shown. In one aspect, a rear end 787 of the tray bottom panel 785 is higher than a front end 786 of the tray bottom panel 785.

Figure 22:
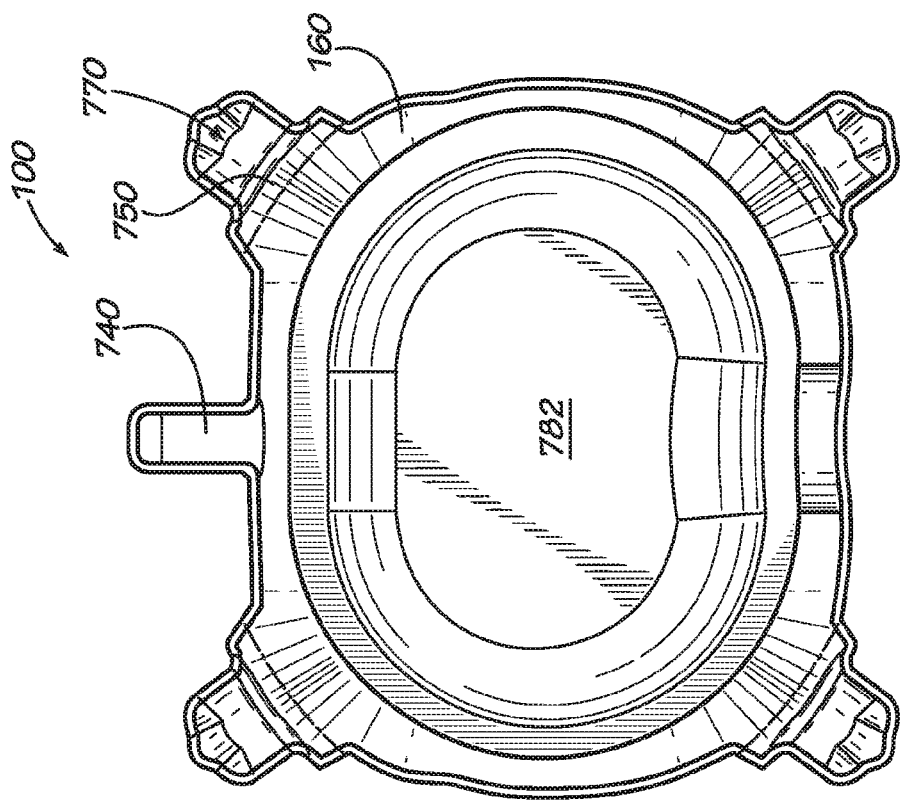
FIG. 22 is a bottom view of the elevated feeding tray apparatus of FIG. 15.
Figure 21:
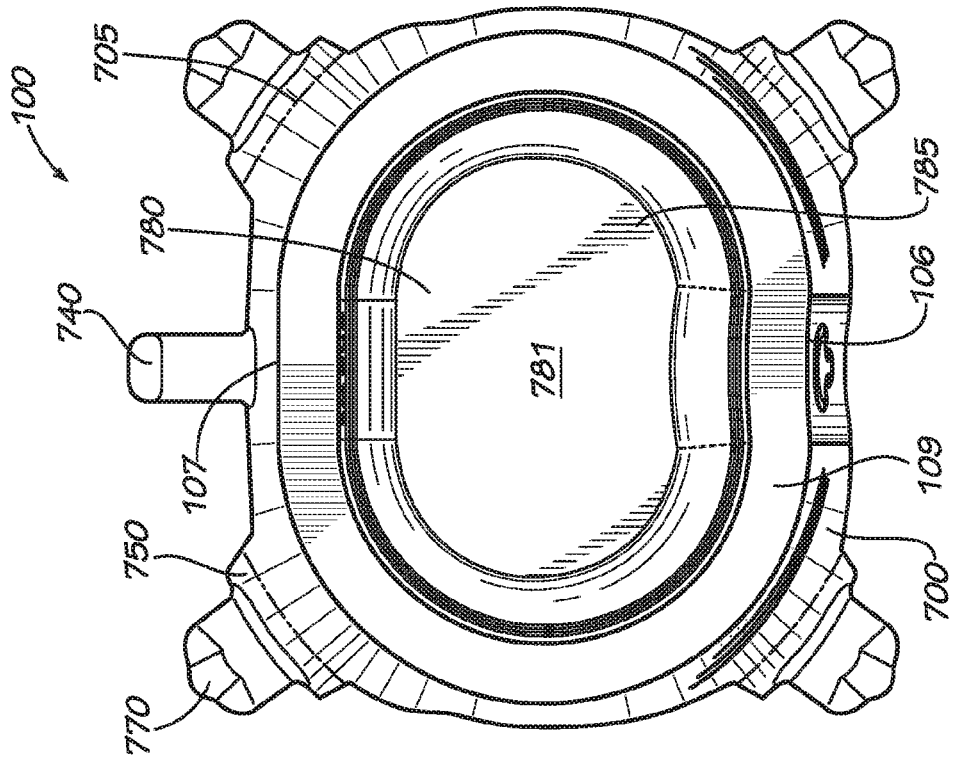
FIG. 21 is a top view of the elevated feeding tray apparatus of FIG. 15.

FIGS. 20, 21, and 22 show the previously described features in side, top, and bottom views, respectively, of the elevated feeding tray apparatus 100.

Figure 23:
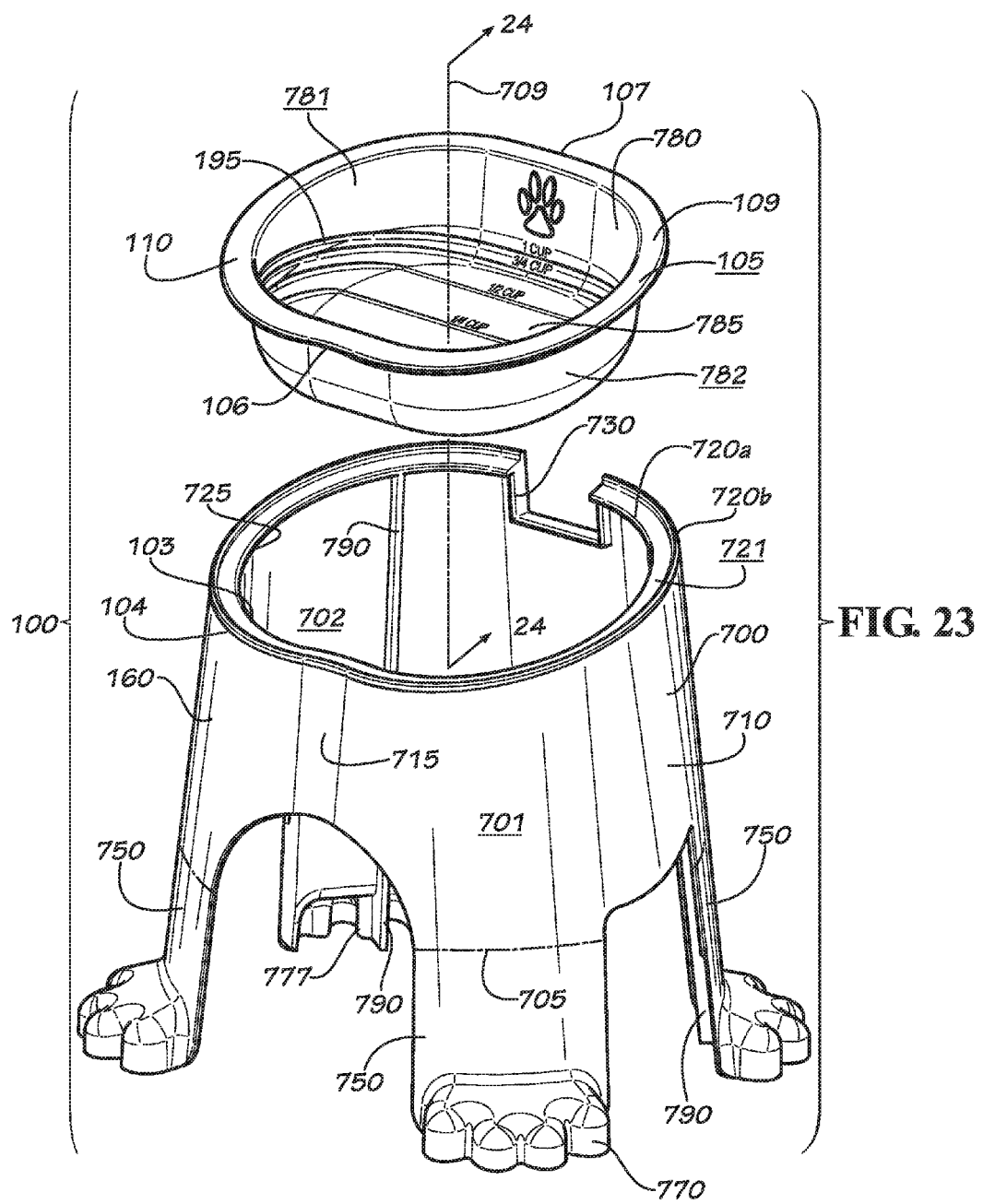
FIG. 23 is an exploded perspective view of an elevated feeding tray apparatus in accordance with yet another aspect of the current disclosure.

FIGS. 23-32 show the elevated feeding tray apparatus 100 or components thereof in accordance with yet another aspect of the current disclosure. The tray 110 is shown removed from the tray riser along the vertical axis 709. In one aspect, as shown in FIG. 23, the elevated feeding tray apparatus 100 comprises a tray riser 160 configured to receive a tray 110 comprising a bowl 780 and a rim 109 connected to the bowl 780. The rim 109 resembles a flange around a perimeter of the bowl 780.

The tray riser can further comprise the rib 790, which can be formed from or otherwise made part of the tray riser 160 proximate to each leg 750 and protruding from the inner surface 702 of the tray riser 160. In one aspect, the rib 790 extends from the bottom of the leg 750 proximate to the receiver 777 of the foot portion 770 towards a first rim 720a of the elevated base 700 that is proximate to a top end of the tray riser 160. In another aspect, the rib 790 can be present only on that portion of the tray riser directly behind the leg 750. In another aspect, the rib 790 can extend a shorter or longer distance inside the tray riser 160. In another aspect, the rib 790 can extend from the outer surface 701 of the tray riser 700.

In one aspect, the first rim 720a lies in a roughly horizontal orientation when viewed from the front of the elevated feeding tray apparatus 100 and is sized to receive the rim 109 of the tray 110. In such aspect, the first rim 720 further defines an opening 725 for receiving the bowl 780 of the tray 110. The tray riser 160 can comprise a second rim 720b that lies in a roughly vertical direction and can help maintain the position of the tray 110 when installed in the tray riser 160 and maintain a flat surface across the top of the assembled elevated feeding tray apparatus 100. The first rim 720a and the second rim 720b define the rim surface 721. At the rear end 107 of the tray riser, the elevated base 700 defines the notch 730, the precise appearance of which can have various forms. In one aspect, the notch 730, as shown in FIG. 23, comprises straight sides and a straight bottom that meets at a 90-degree angle which each of the straight sides.

Figure 24:
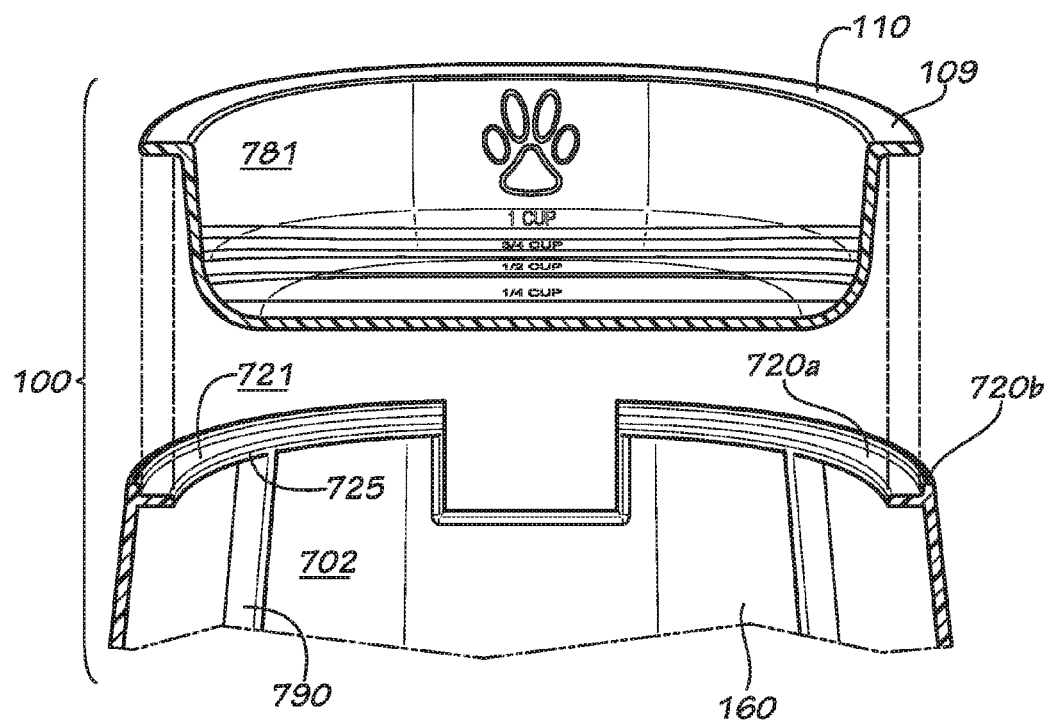
FIG. 24 is a sectional view of the elevated feeding tray apparatus of FIG. 23 taken along line 24-24 of FIG. 23.

FIG. 24 shows the interaction between the tray 110 and the tray riser 160 in cross-section. With the tray 110 aligned with the tray riser 160 along a vertical axis 709, the tray 110 can be lowered towards the opening 725 of the tray riser 160 until the rim 109 rests on the first rim 720a and adjacent to and inside the second rim 720b.

Figure 25:
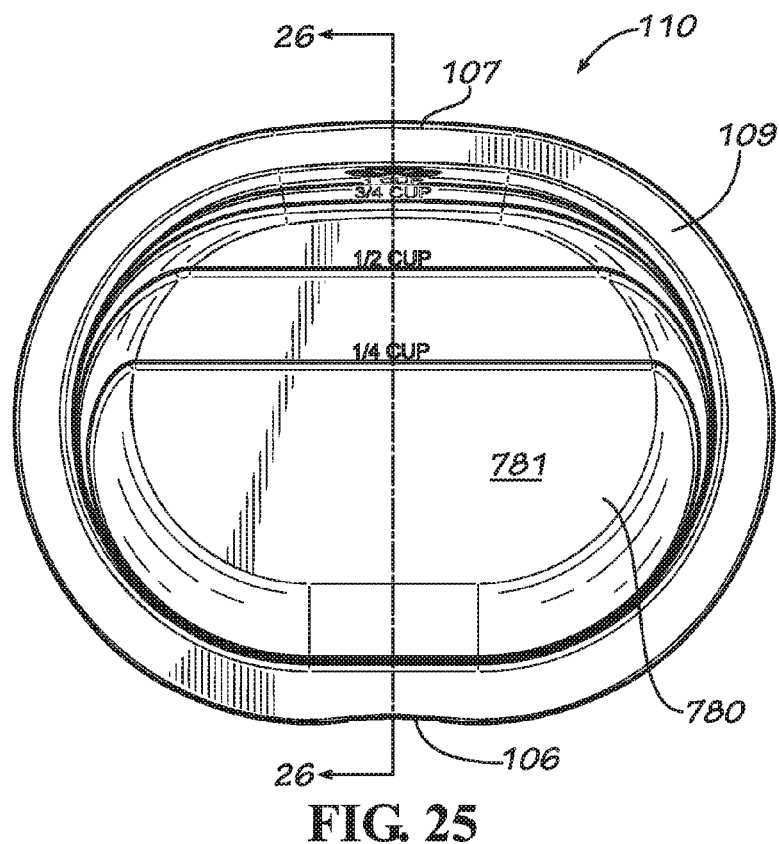
FIG. 25 is a top view of a tray of the elevated feeding tray apparatus of FIG. 23.
Figure 26:
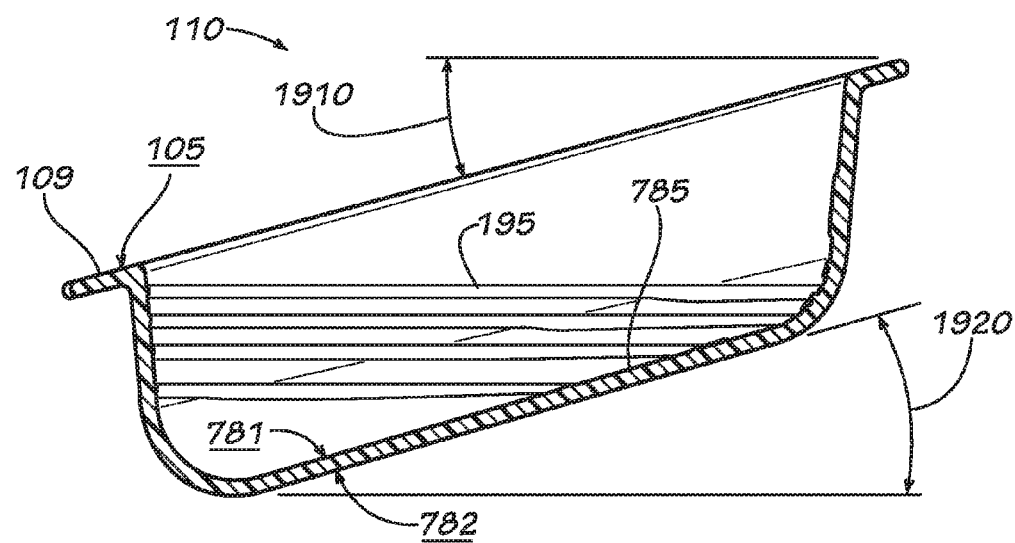
FIG. 26 is a sectional view of the tray of FIG. 25 taken along line 26-26 of FIG. 25.
Figure 27:
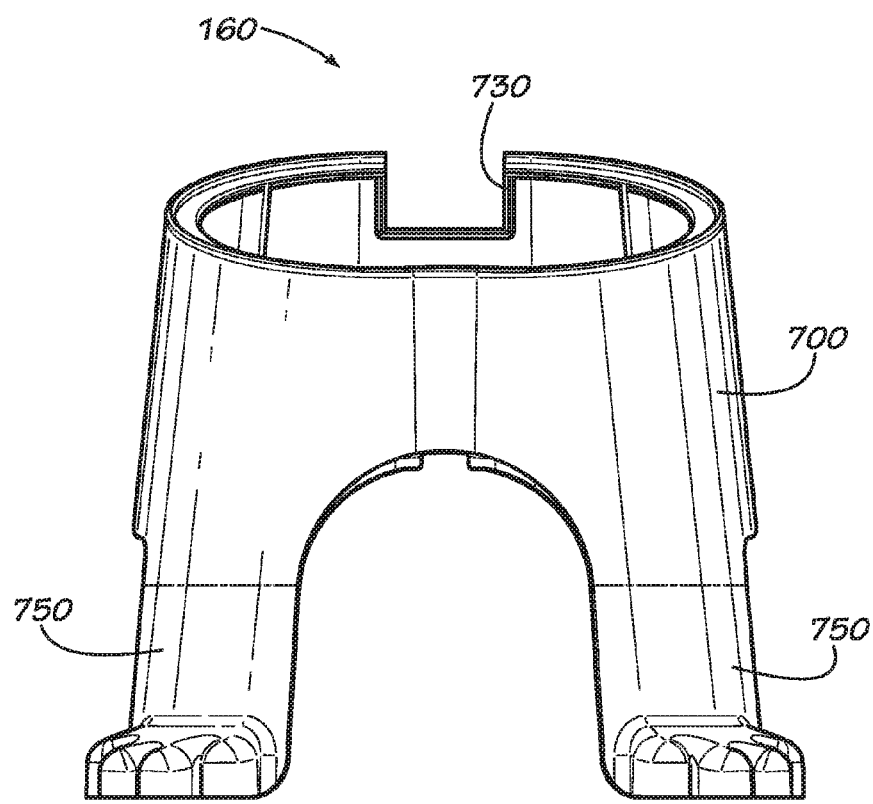
FIG. 27 is a front view of a tray riser of the elevated feeding tray apparatus of FIG. 23.
Figure 29:
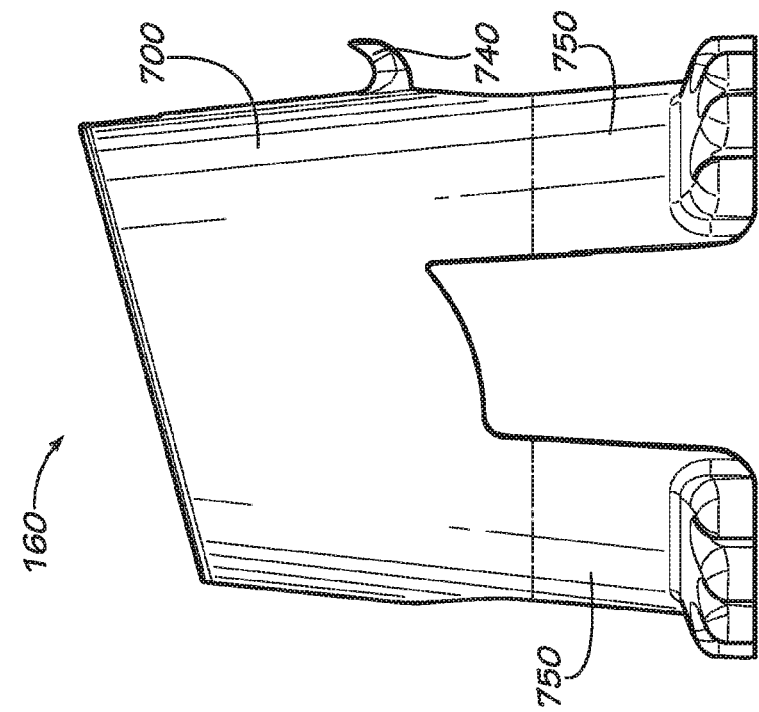
FIG. 29 is a side view of the tray riser of FIG. 27.
Figure 28:
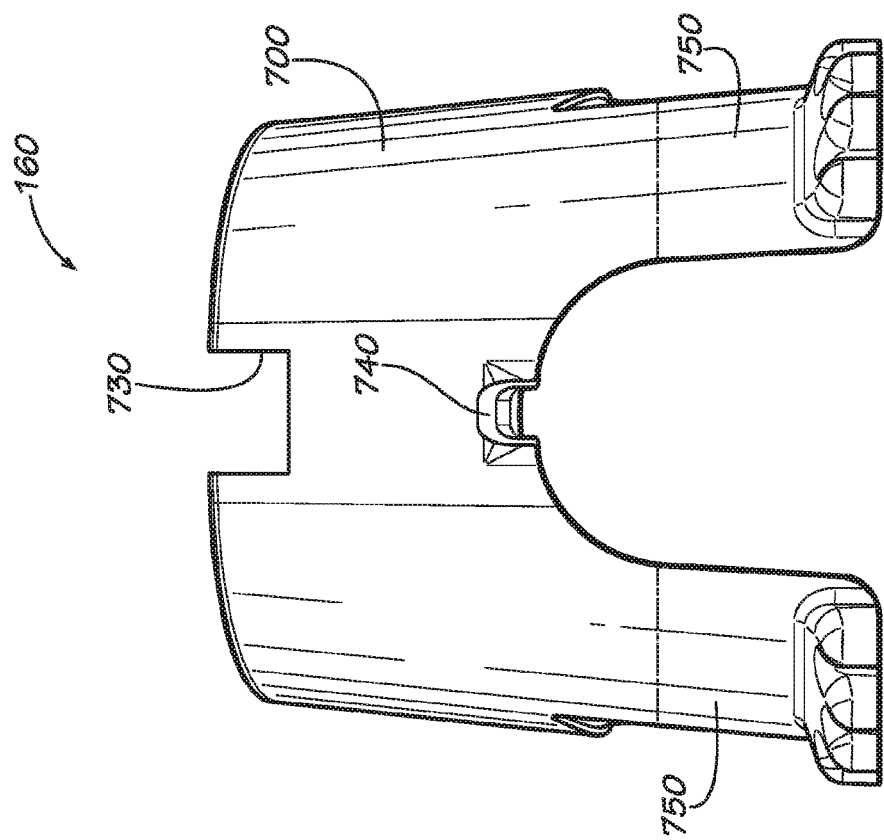
FIG. 28 is a rear view of the tray riser of FIG. 27.
Figure 30:
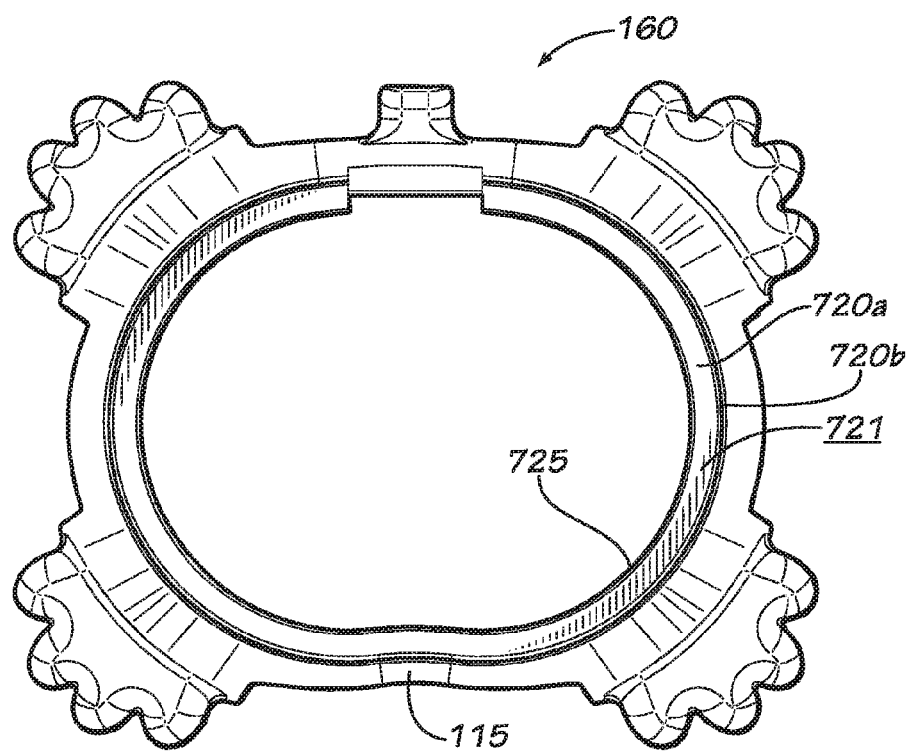
FIG. 30 is a top view of the tray riser of FIG. 27.
Figure 31:
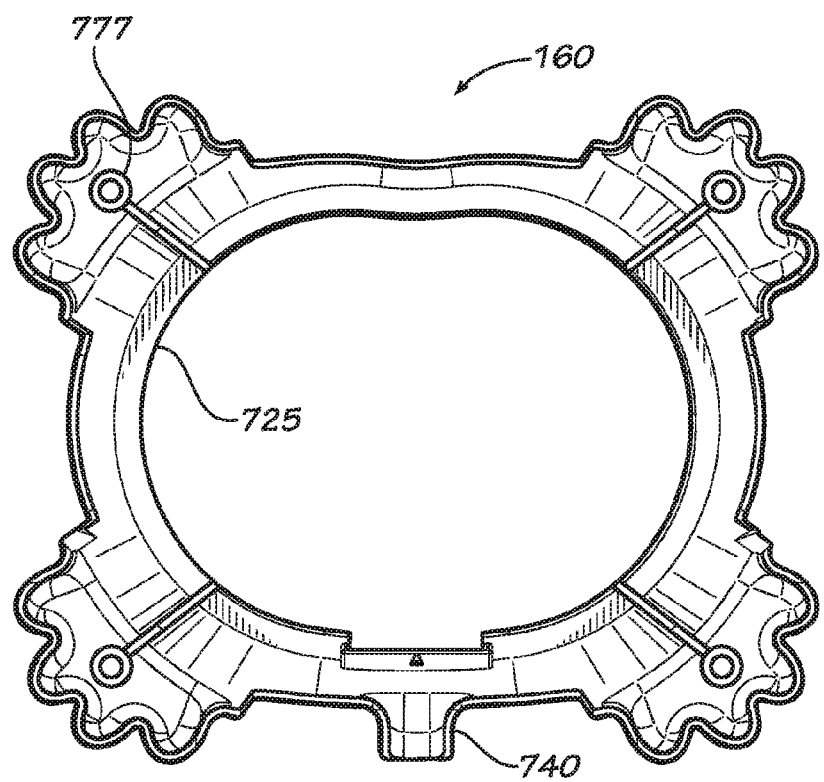
FIG. 31 is a bottom view of the tray riser of FIG. 27.
Figure 32:
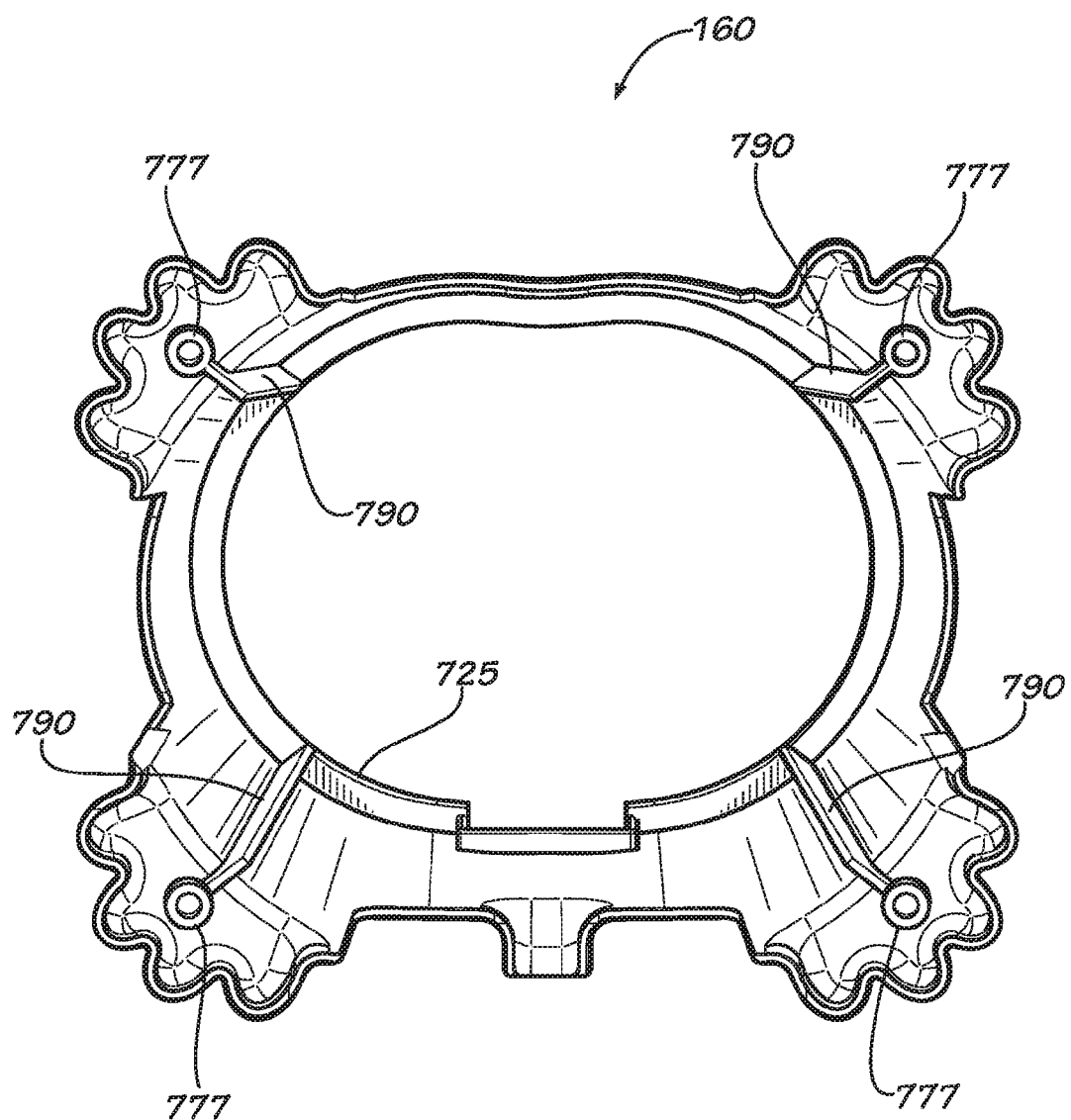
FIG. 32 is a bottom perspective view of the tray riser of FIG. 27.

FIGS. 25 and 26 respectively show a top view and a sectional side view of the tray 110. In one aspect, the tray 110 comprising the bowl 780 is roughly elliptical in shape. In another aspect, the tray 110 can be any other shape can have straight or rounded sides or both. In one aspect, as shown by the fill level indicia 195 in FIG. 26, the bowl 780 when installed in the tray riser 160 can hold approximately one cup of food or other material. In one aspect, as shown, the fill level indicia are level and thus angled at the angle 1910 with respect to the rim 109. The capacity will tend to increase as the food or other material placed inside the bowl 780 resembles a solid more than a liquid. In another aspect, a depth of the bowl 780 of the tray 110 can be increased to increase the capacity of the bowl 780. In another aspect, the angle 1920 at which the tray bottom panel 785 is sloped can be decreased to increase the capacity of the bowl 780. In another aspect, the angle 1910 at which the rim 109 is sloped can be decreased to increase the capacity of the bowl 780. In such aspect, the slope of the rims 720a,b can be adjusted to match.

FIGS. 27-32 show the previously described features in front, rear, side, top, and bottom views, respectively, of the elevated feeding tray apparatus 100.

FIGS. 33-42 show the elevated feeding tray apparatus 100 or components thereof in accordance with yet another aspect of the current disclosure.

Figure 33:
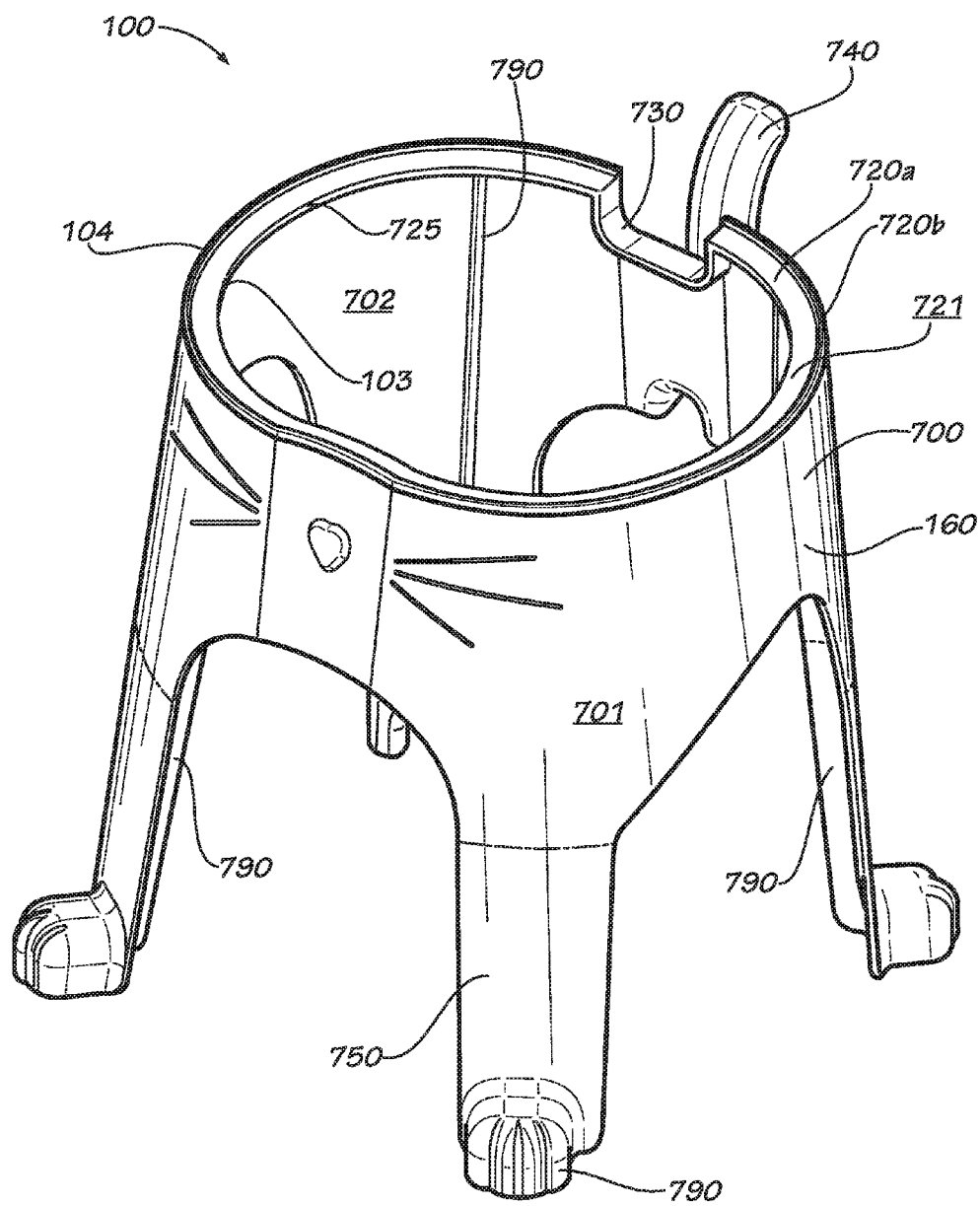
FIG. 33 is a perspective view of a tray riser of an elevated feeding tray apparatus in accordance with yet another aspect of the current disclosure.

In one aspect the notch 730, as shown in FIG. 33, comprises straight sides and a straight bottom but a radius is formed at the intersection between the bottom and each of the straight sides. Each of the ribs 790 is shown, as in FIG. 23, extending from the foot portion 770 of the leg 750 to the first rim 720a proximate the opening 725. The height of the rib 790, as measured from the inner surface 702 of the tray riser 160, can be adjusted to increase the strength of the legs 750 and thus their resistance to buckling under a compressive load from above or a bending load from the side.

Figure 34:
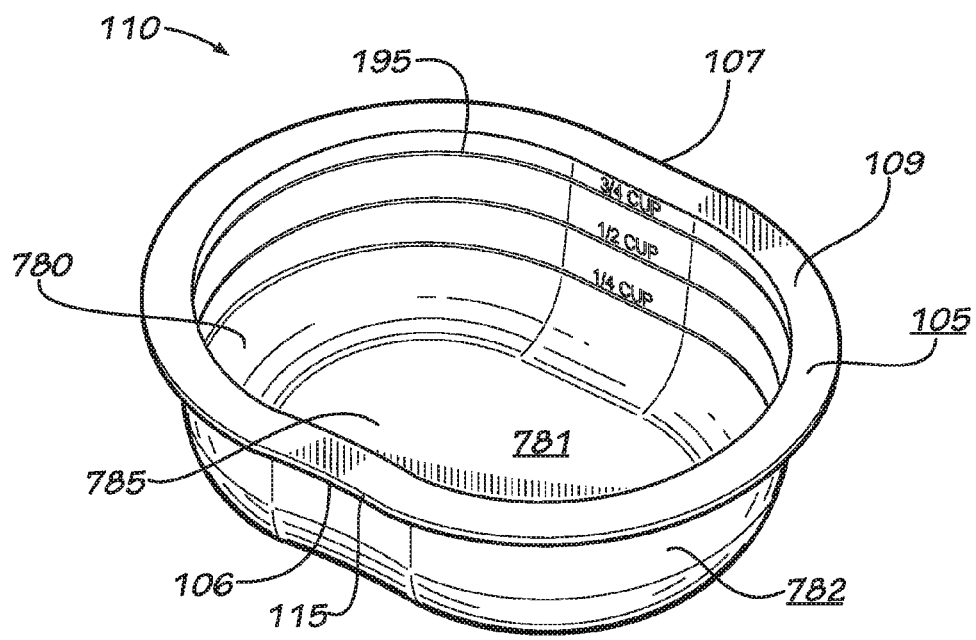
FIG. 34 is a perspective view of a tray of the elevated feeding tray apparatus of FIG. 33 in accordance with yet another aspect of the current disclosure.
Figure 35:
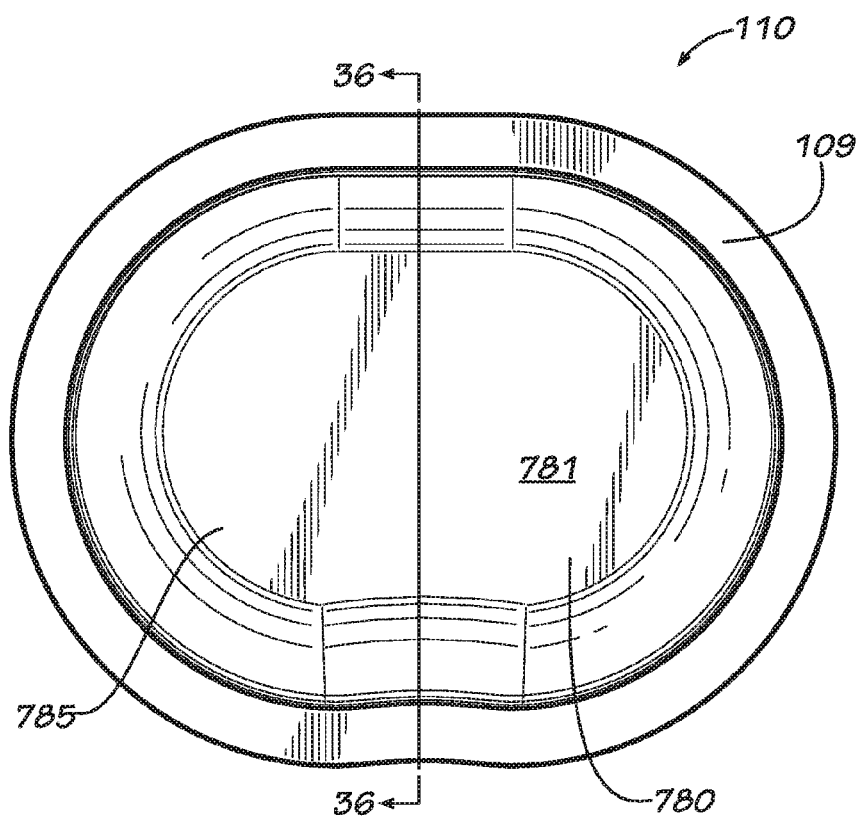
FIG. 35 is a top view of the tray of FIG. 34.
Figure 36:
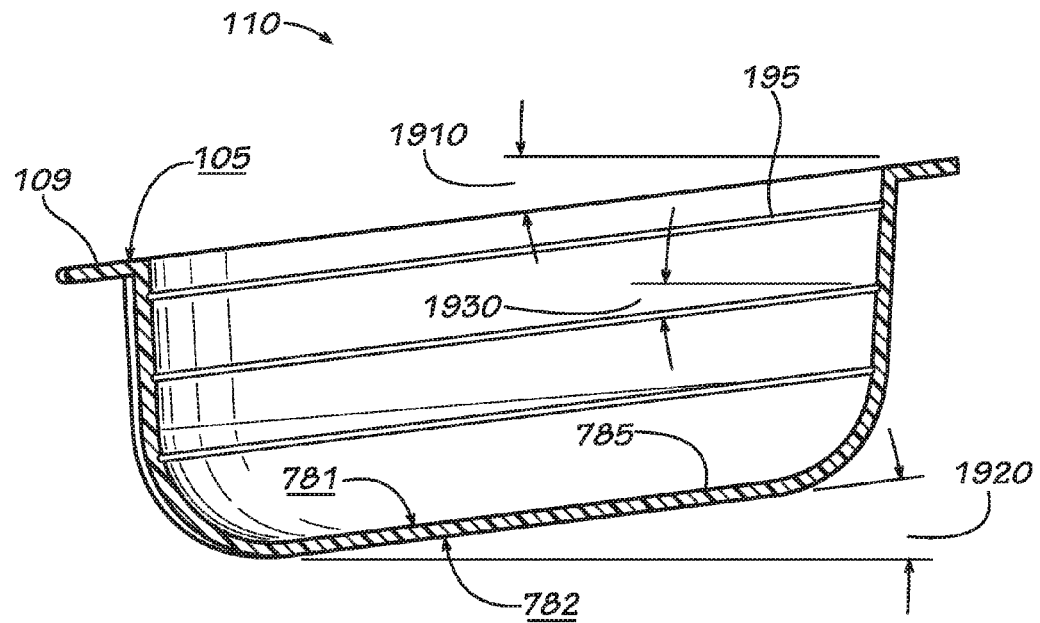
FIG. 36 is a side sectional view of the tray of FIG. 34.
Figure 37:
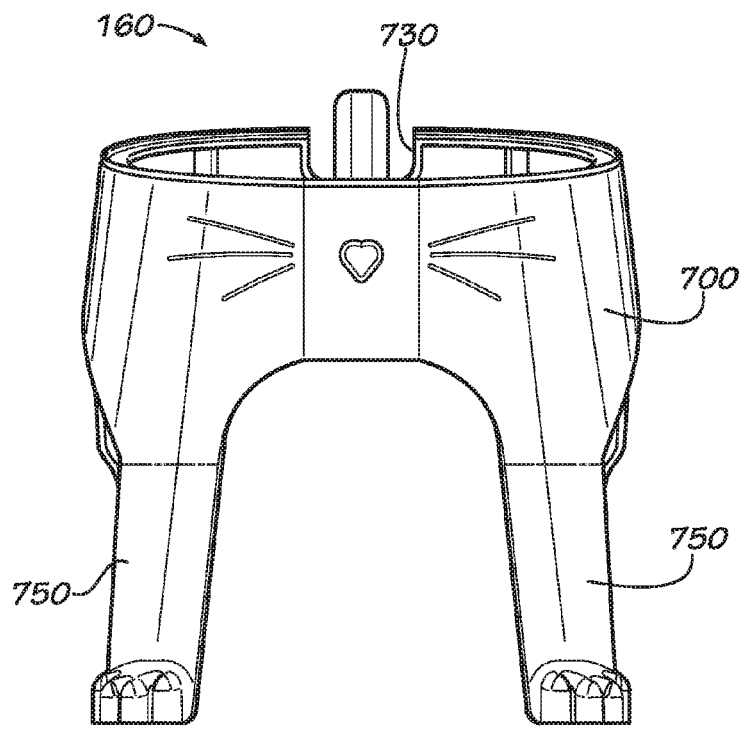
FIG. 37 is a front view of the tray riser of FIG. 33.
Figure 39:
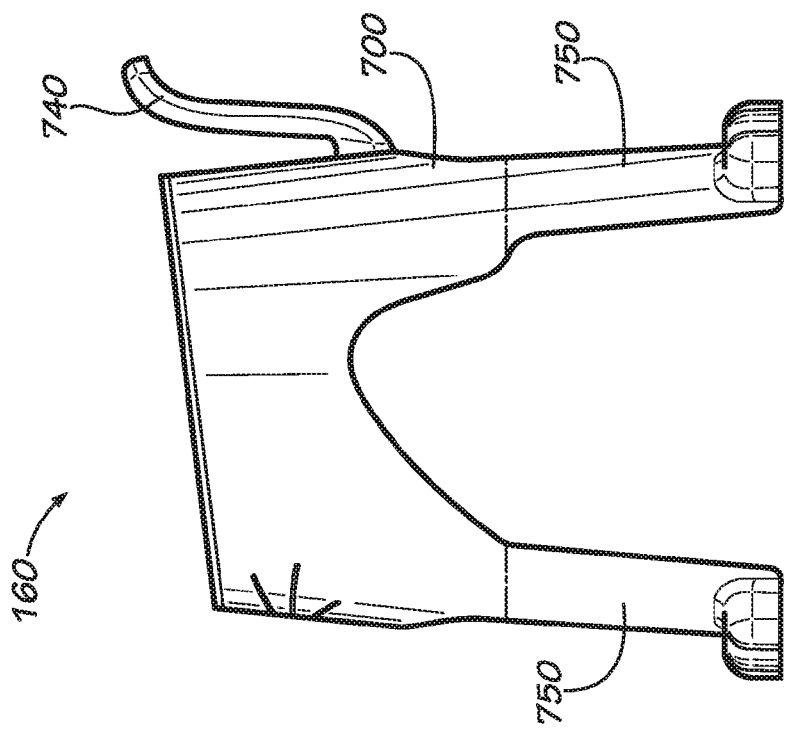
FIG. 39 is a side view of the tray riser of FIG. 33.
Figure 38:
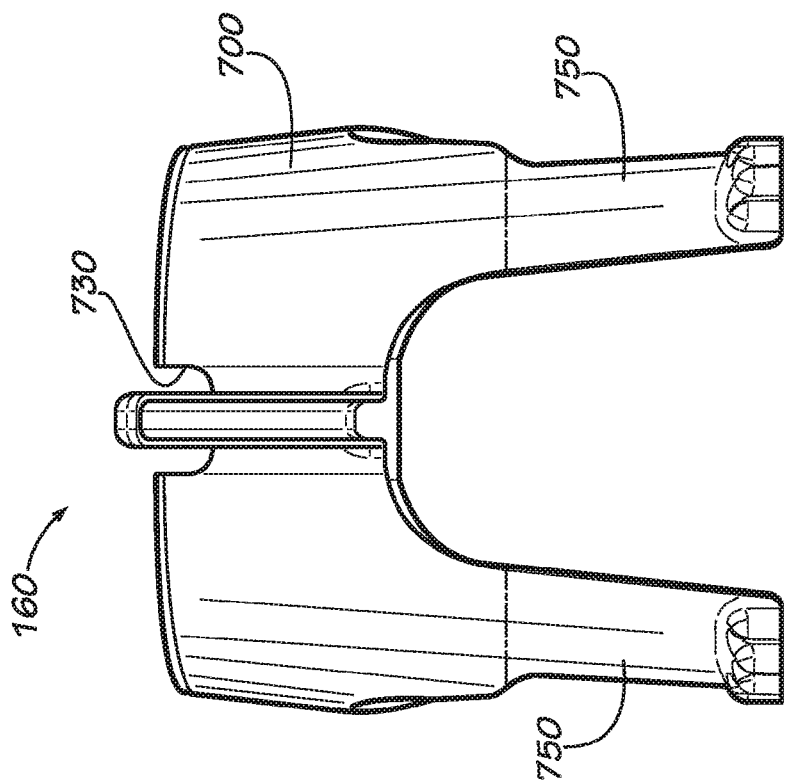
FIG. 38 is a rear view of the tray riser of FIG. 33.
Figure 40:
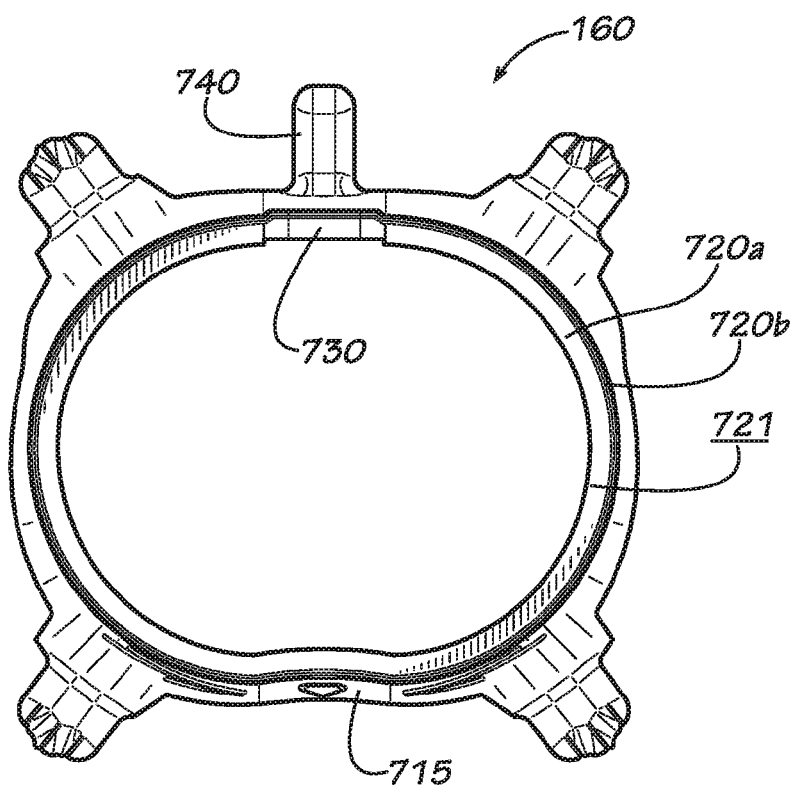
FIG. 40 is a top view of the tray riser of FIG. 33.
Figure 41:
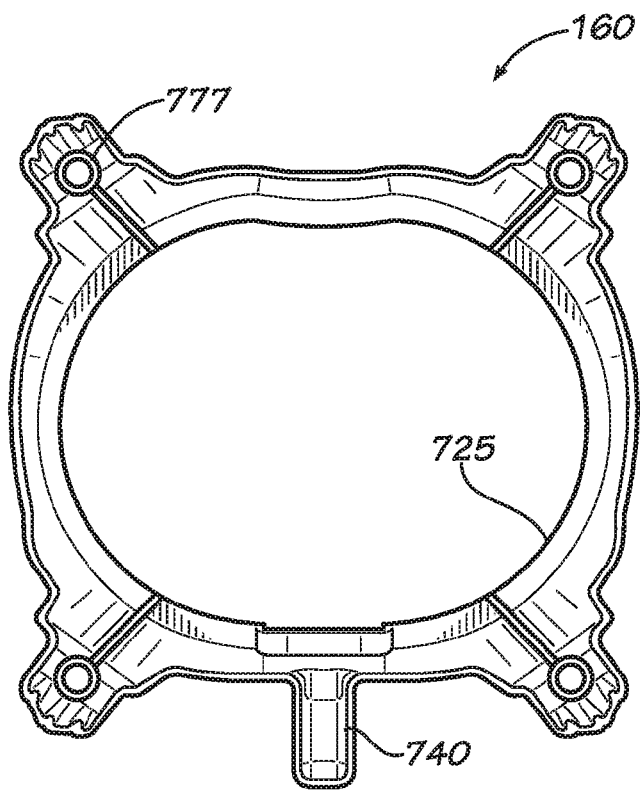
FIG. 41 is a bottom view of the tray riser of FIG. 33.
Figure 42:
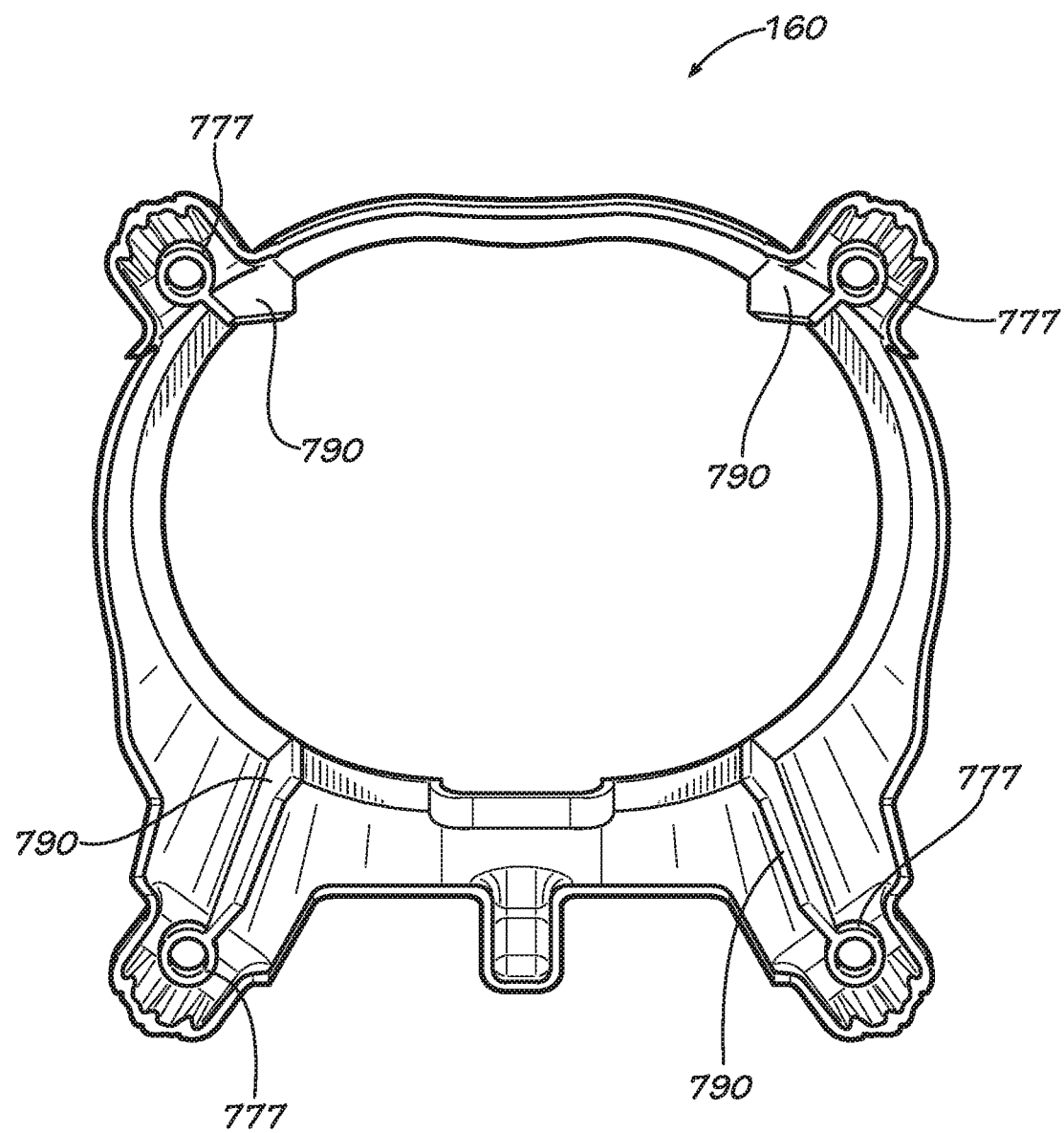
FIG. 42 is a bottom perspective view of the tray riser of FIG. 33.

FIGS. 34-36 respectively show a perspective view, a top view, and a sectional side view of the tray 110. In one aspect, as shown by the fill level indicia 195 in FIGS. 34 and 36, the bowl 780 when installed in the tray riser 160 can hold approximately ¾ cup of solid food or other solid material or approximately ½ cup of food behaving as a liquid. In one aspect, as shown, the fill level indicia are angled at an angle 1930 with respect to a horizontal orientation, and as shown the angle 1930 approximates the angle 1910 at which the rim is angled with respect to a horizontal orientation. As described previously, the capacity can be adjusted by modifying certain dimensions of the bowl 780 or the tray riser 160.

FIGS. 37-42 show the elevated feeding tray apparatus 100 or components thereof in accordance with yet another aspect of the current disclosure.

Figure 43:
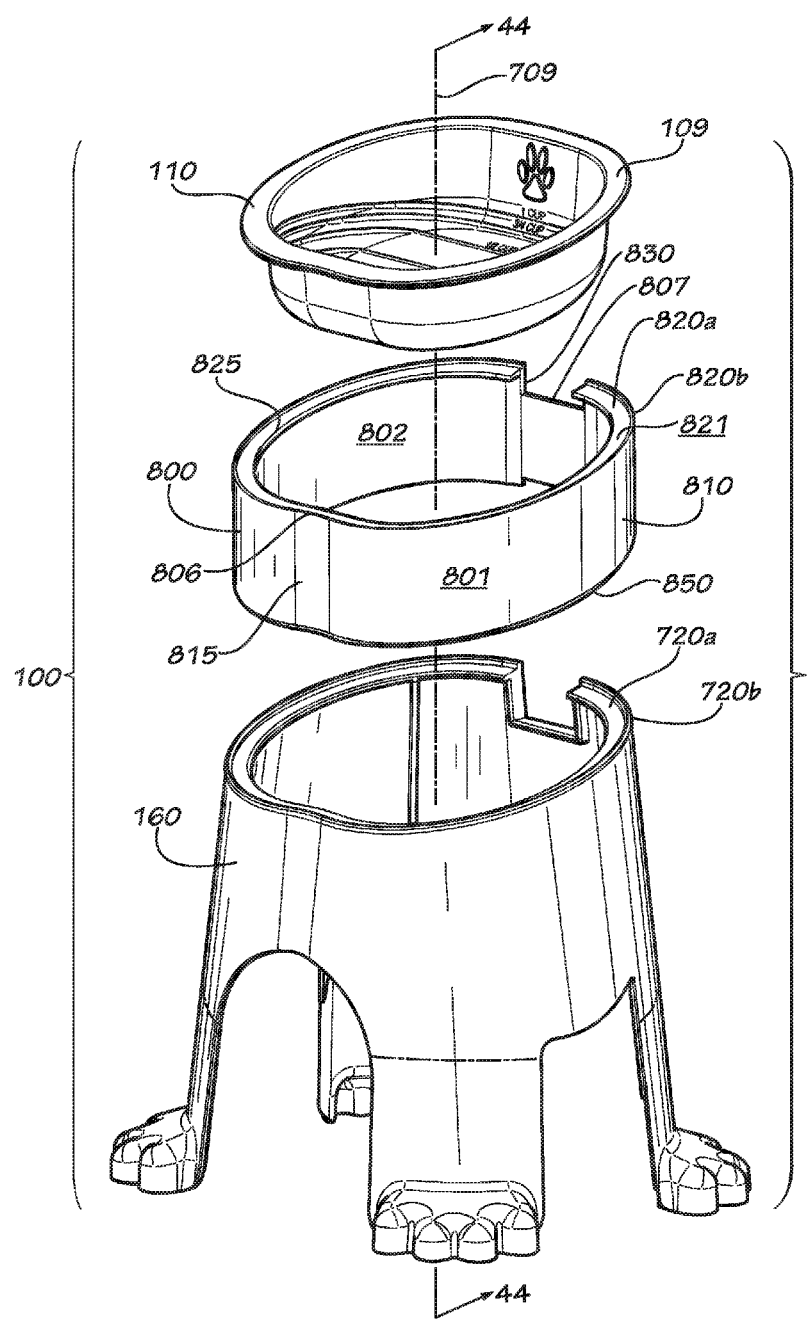
FIG. 43 is an exploded perspective view of an elevated feeding tray apparatus comprising a tray spacer in accordance with yet another aspect of the current disclosure.
Figure 44:
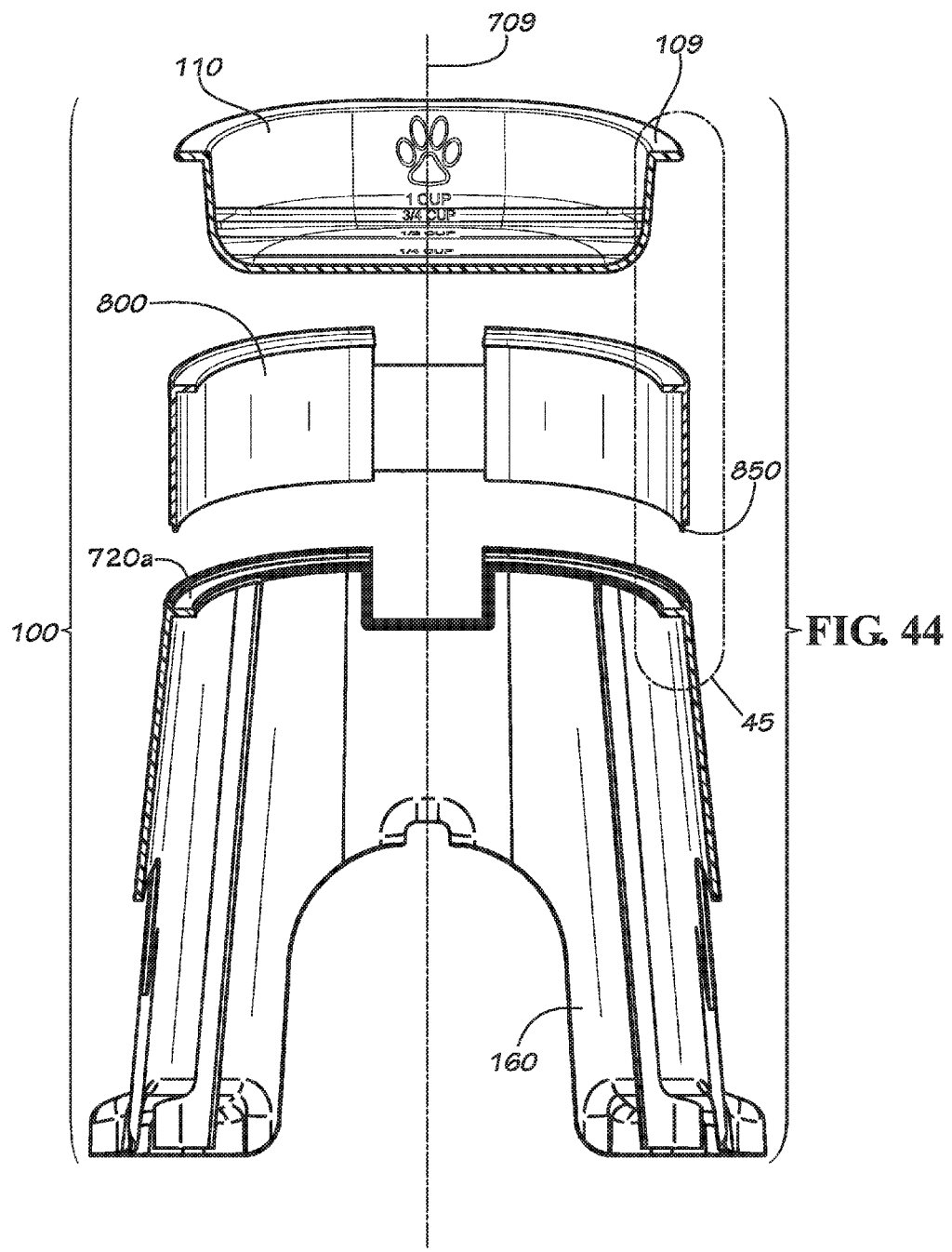
FIG. 44 is an exploded sectional view of the elevated feeding tray apparatus of FIG. 43 taken along line 44-44 of FIG. 43.

The elevated feeding tray apparatus 100 can additionally comprise a tray spacer for lifting the height of the tray 110 relative to the surface on which the elevated feeding tray apparatus 100 is placed. FIGS. 43 and 44 show the interaction between the tray 110, a tray spacer 800, and the tray riser 160 in cross-section. In one aspect, the tray spacer 800 comprises a side wall 810, a bottom rim 850 at a bottom end of the tray spacer 800, and a first rim 820a at a top end of the of the tray spacer 800.

In one aspect, the first rim 820a lies in a roughly horizontal orientation when viewed from the front of the elevated feeding tray apparatus 100 and is sized to receive the rim 109 of the tray 110. In such aspect, the first rim 820a further defines an opening 825 for receiving the bowl 780 of the tray 110. The tray spacer 800 can comprise a second rim 820b that lies in a roughly vertical direction and can help maintain the position of the tray 110 when installed in the tray spacer 800 and maintain a flat surface across the top of the assembled elevated feeding tray apparatus 100. The first rim 820a and the second rim 820b define the rim surface 821. The first rim 820a and the second rim 820b define an opening 825 in the tray spacer that is configured to receive the bowl 780 of the tray 110.

The tray spacer further defines an outer surface 801 and an inner surface 802 and can have an elongated ring shape as shown. At a front end 806 of the tray spacer 800, the tray spacer 806 can define an asymmetrical feature 815, the precise appearance of which can have various forms. At a rear end 807, the tray spacer 800 can define a notch 830, the precise appearance of which can also have various forms. In one aspect, the tray 110 and the tray spacer 800 at the notch 830 defining an access gap that is configured to receive a human finger or similar tool for lifting the tray 110 from the tray spacer 800 when the tray 110 is installed in the tray spacer 800.

With the tray 110 aligned with the tray spacer 800 and the tray riser 160 along a vertical axis 709, the tray 110 can be lowered towards the opening 825 until the rim 109 engages with or rests on the first rim 820a of the tray spacer and adjacent to and inside the second rim 820b. The tray spacer 800 can likewise be lowered towards the opening 725 of the tray riser 160 until the bottom rim 850 engages with or rests on the first rim 720a of the tray riser and adjacent to and inside the second rim 720b.

Figure 45:
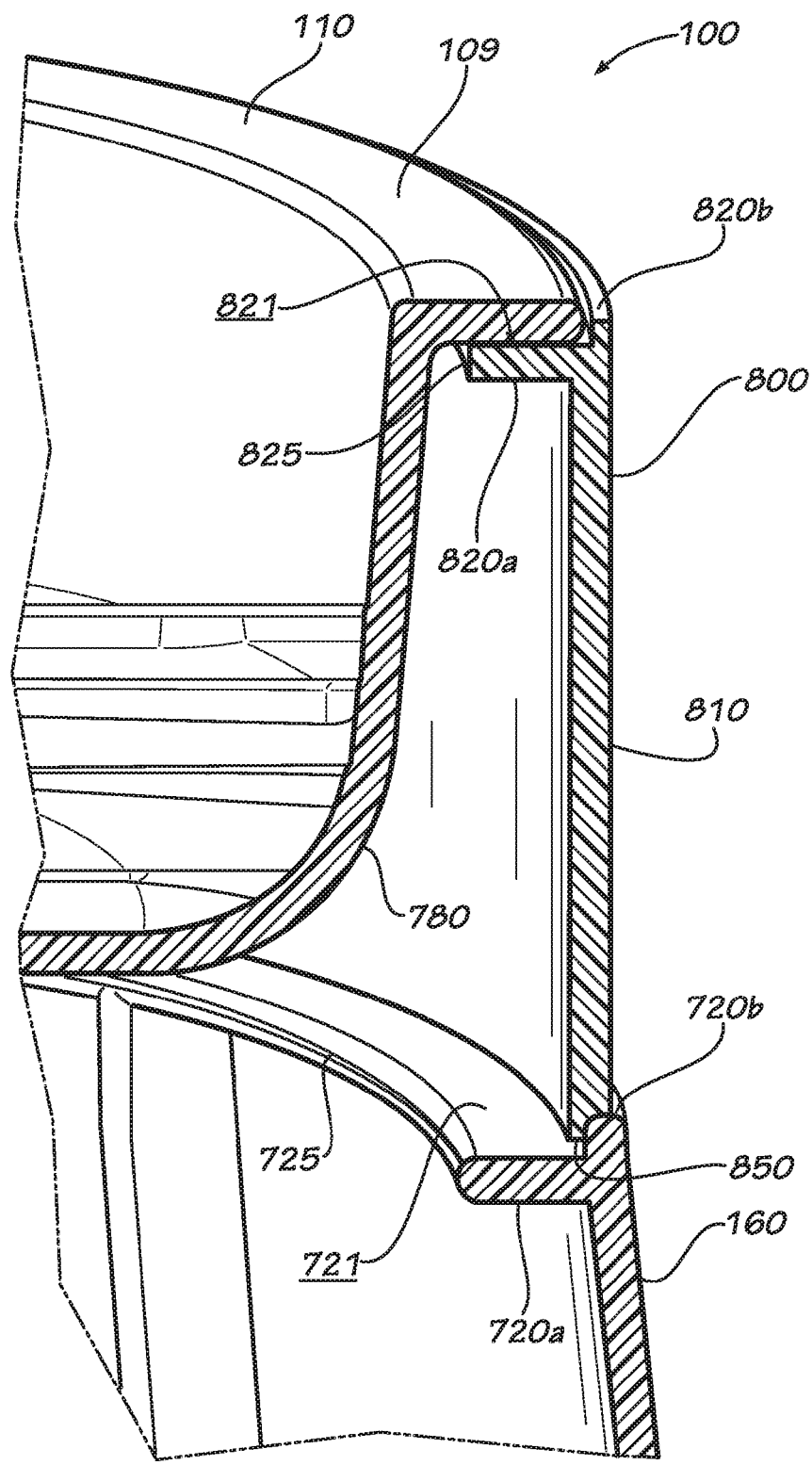
FIG. 45 is a detail view of the elevated feeding tray apparatus of FIG. 43 taken from detail 45 of FIG. 44.

FIG. 45 shows a detail view of the described interaction after the tray 110, the tray spacer 800, and the tray riser 160 have been assembled. The rim 109 of the tray 110 is in facing contact with the rim surface 821 of the first rim 820a and is adjacent to the second rim 820b of the tray spacer 800. The bottom rim 850 of the tray spacer 800, located distance the first rim 820a and the second rim 820b at a bottom end of the side wall 810, is in facing contact with the rim surface 721 of the first rim 720a and is adjacent to the second rim 720b of the tray riser 160. In one aspect, the bowl 780 extends into the opening 825 but not into the opening 725. In another aspect, the bowl 780 can extend into both the opening 825 and the opening 725. As shown, the tray spacer has a height from the lowest part of the bottom rim 850 to the highest part of the second rim 820b of about two inches. In another aspect, the height can be any value desirable by the user. In one aspect, only one tray spacer 800 is used in the elevated feeding tray apparatus 100. In another aspect, multiple tray spacers 800 can be stacked on top of one another between the tray 110 and the tray riser 160. In yet another aspect, a spacer (not shown) can be positioned below the tray riser to raise the position of the tray 110, or individual spacers can be positioned under each of the plurality of legs 750 to raise the position of the tray 110.

With respect to any figures depicting hidden lines, it is contemplated that such hidden lines represent claimed structure in various embodiments. In one aspect, all the hidden lines can be drawn as solid lines.

Finally, it has been found that animals who are aging and have difficult bending down to feed benefit from using a feeder such as the elevated feeding tray apparatus 100 that makes it easier for them to access their food.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An elevated feeding tray apparatus comprising:
a tray riser comprising an elevated base, a plurality of legs attached to the elevated base, and a vertical side wall; the elevated base comprising a rim extending in a substantially horizontal plane from the vertical side wall and defining a top outer edge and a top inner edge, a portion of both the top outer edge and the top inner edge of the tray riser at a rear end of the tray riser higher than both the top outer edge and the top inner edge of the tray riser at a front end of the tray riser; each of the plurality of legs comprising an attachment portion proximate to the elevated base and a foot portion distal from the attachment portion and extending from the vertical side wall; and
a tray separately removable from the tray riser, the tray comprising a bowl and a rim extending from the bowl, the bowl defining a feeding cavity and comprising a tray bottom panel, the tray riser configured to hold the tray at an angle with respect to a horizontal plane, a top edge of the tray at a rear end of the tray higher than a top edge of the tray at a front end of the tray and the tray bottom panel higher at a rear end of the tray bottom panel than at a front end of the tray bottom panel when the tray is installed in the tray riser.

2. The apparatus of claim 1, wherein the elevated base and the plurality of legs of the tray riser are integrally formed.

3. The apparatus of claim 1, wherein the tray riser and the tray are formed from plastic.

4. The apparatus of claim 1, wherein each of the plurality of legs further comprises a rib extending from the rim of the tray riser to the foot portion.

5. The apparatus of claim 1, wherein an inner surface of the bowl defines fill level indicia.

6. The apparatus of claim 1, wherein the rim of the tray substantially covers the rim of the tray riser when the tray is installed in the tray riser.

7. The apparatus of claim 1, wherein the foot portion of at least one of the plurality of legs comprises skid control material.

8. The apparatus of claim 1, wherein the tray bottom panel is substantially planar.

9. The apparatus of claim 5, wherein the tray bottom panel defines fill level indicia.

10. The apparatus of claim 1, wherein the elevated base of the tray riser defines a notch in at least one of the rear end and the front end of the tray riser, the tray and the tray riser defining an access gap at the notch when the tray is assembled to the tray riser.

11. The apparatus of claim 1, further comprising a tray spacer positioned between the tray riser and the tray, at least a one of a top end and a bottom end of the tray spacer defining an opening configured to receive the tray.

12. The apparatus of claim 11, wherein the tray spacer comprises a side wall, a bottom rim proximate to a bottom end of the tray spacer and extending from the side wall, and a first rim proximate to a top end of the tray spacer and extending from the side wall.

13. An elevated feeding tray apparatus comprising:
an elevated base comprising a top front edge, a top back edge, and a vertical side wall, a portion of the top back edge higher than the top front edge;
a plurality of legs extending from the elevated base, each of the plurality of legs comprising an attachment portion proximate to the elevated base, a vertical side wall, a foot portion distal from the attachment portion and extending from the vertical side wall, and an inner rib; and
a tray comprising a bowl comprising a rim, the bowl being watertight below the rim, the bowl defining a feeding cavity and comprising a tray bottom panel, an outer edge of the rim of the bowl substantially aligned vertically with the vertical side wall of the elevated base;
wherein the elevated base and the plurality of legs are integrally formed from substantially the same material and the elevated base is configured to hold the tray at an angle with respect to a horizontal plane, a top edge of the tray at a rear end of the tray higher than a top edge of the tray at a front end of the tray and the tray bottom panel higher at a rear end of the tray bottom panel than at a front end of the tray bottom panel.

14. The apparatus of claim 13, wherein the tray further comprises a tray bottom panel that is substantially planar, wherein a top end of the tray bottom panel is higher than a bottom end of the tray bottom panel.

15. The apparatus of claim 13, wherein the thickness of each portion of the elevated feeding tray apparatus is constant throughout.

16. The apparatus of claim 13, wherein each of the plurality of legs further comprises a rib extending from the rim of the tray riser to the foot portion.

17. The apparatus of claim 13, wherein the tray further comprises a tray bottom panel that is substantially planar.

18. The apparatus of claim 11, wherein the tray spacer defines a notch at a rear end of the tray spacer.

19. The apparatus of claim 11, wherein the tray spacer defines a height that is substantially equal around a perimeter of the tray spacer.

20. The apparatus of claim 1, wherein the tray riser further comprises a second rim extending in a roughly vertical direction proximate to the top end of the tray riser and configured to maintain the tray in a fixed position when installed in the tray riser.

\* \* \* \* \*